United States Patent
Nakagawa

(10) Patent No.: US 9,555,707 B2
(45) Date of Patent: Jan. 31, 2017

(54) IN-VEHICLE INPUT SYSTEM

(75) Inventor: Kunihiro Nakagawa, Anjo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 937 days.

(21) Appl. No.: 13/134,098

(22) Filed: May 27, 2011

(65) Prior Publication Data

US 2011/0296340 A1    Dec. 1, 2011

(30) Foreign Application Priority Data

May 31, 2010    (JP) .............................. 2010-124904

(51) Int. Cl.
| | | |
|---|---|---|
| *B60K 35/00* | (2006.01) | |
| *B60H 1/00* | (2006.01) | |
| *G06F 3/0487* | (2013.01) | |
| *G06F 3/0338* | (2013.01) | |

(52) U.S. Cl.
CPC ........... *B60K 35/00* (2013.01); *B60H 1/00985* (2013.01); *G06F 3/0338* (2013.01); *G06F 3/0487* (2013.01); *B60K 2350/102* (2013.01); *B60K 2350/1004* (2013.01); *B60K 2350/106* (2013.01); *B60K 2350/1068* (2013.01); *B60K 2350/925* (2013.01)

(58) Field of Classification Search
CPC ...................... G06F 3/0487; B60K 2350/1004
USPC ...... 715/764, 783, 840, 817, 820; 701/1, 41; 345/156
See application file for complete search history.

(56) References Cited

U.S. PATENT DOCUMENTS

| | | | | |
|---|---|---|---|---|
| 5,612,881 A | * | 3/1997 | Moroto et al. | 701/428 |
| 5,805,167 A | * | 9/1998 | van Cruyningen | 715/808 |
| 5,847,704 A | * | 12/1998 | Hartman | 715/764 |
| 6,373,472 B1 | * | 4/2002 | Palalau et al. | 345/173 |
| 6,650,345 B1 | * | 11/2003 | Saito et al. | 715/764 |
| 7,313,467 B2 | * | 12/2007 | Breed et al. | 701/1 |
| 2001/0021887 A1 | * | 9/2001 | Obradovich et al. | 701/1 |
| 2001/0024203 A1 | * | 9/2001 | Yamada et al. | 345/428 |
| 2002/0013815 A1 | * | 1/2002 | Obradovich et al. | 709/204 |
| 2002/0140633 A1 | * | 10/2002 | Rafii et al. | 345/8 |
| 2003/0004616 A1 | * | 1/2003 | Obradovich et al. | 701/1 |
| 2003/0152088 A1 | * | 8/2003 | Kominami et al. | 370/401 |

(Continued)

FOREIGN PATENT DOCUMENTS

| | | |
|---|---|---|
| JP | 6-67829 | 3/1994 |
| JP | 9-62478 | 3/1997 |

(Continued)

*Primary Examiner* — Weilun Lo
*Assistant Examiner* — David S Posigian
(74) *Attorney, Agent, or Firm* — Harness, Dickey & Pierce, P.L.C.

(57) ABSTRACT

An in-vehicle input system includes: a display device for displaying screen images having selection items; a selection operation device for moving a cursor from a first selection item to a second selection item to select and input the second selection item; a first image switching device for switching from a current level screen image to a lower level screen image when the selected second selection item is input; a second image switching device for switching from the current level screen image to an upper level screen image when the selection operation device selects and inputs a level return item of the selected second selection item disposed on a nearest screen edge side of the selected second selection item; and a level return item display device for emphasizing a display of the level return item when the second selection item is selected.

22 Claims, 12 Drawing Sheets

(56) References Cited

U.S. PATENT DOCUMENTS

| | | | |
|---|---|---|---|
| 2003/0231208 A1* | 12/2003 | Hanon et al. | 345/764 |
| 2004/0100460 A1* | 5/2004 | Yamada et al. | 345/204 |
| 2004/0176880 A1* | 9/2004 | Obradovich et al. | 701/1 |
| 2004/0225416 A1* | 11/2004 | Kubota et al. | 701/1 |
| 2005/0172230 A1* | 8/2005 | Burk et al. | 715/716 |
| 2005/0229116 A1* | 10/2005 | Endler et al. | 715/862 |
| 2005/0251760 A1* | 11/2005 | Sato et al. | 715/856 |
| 2005/0253820 A1* | 11/2005 | Horiuchi | 345/173 |
| 2006/0020969 A1* | 1/2006 | Utsuki et al. | 725/39 |
| 2006/0155441 A1* | 7/2006 | Berg et al. | 701/41 |
| 2006/0226298 A1* | 10/2006 | Pierson | 246/1 R |
| 2006/0284839 A1* | 12/2006 | Breed et al. | 345/156 |
| 2007/0069914 A1* | 3/2007 | Lenneman et al. | 340/691.6 |
| 2007/0168865 A1* | 7/2007 | Tsutsumi et al. | 715/716 |
| 2007/0262970 A1* | 11/2007 | Matsumoto et al. | 345/173 |
| 2007/0265772 A1* | 11/2007 | Geelen | 701/208 |
| 2008/0066007 A1* | 3/2008 | Lau et al. | 715/783 |
| 2008/0148187 A1* | 6/2008 | Miyata et al. | 715/840 |
| 2008/0192024 A1* | 8/2008 | Mita | 345/173 |
| 2008/0229249 A1* | 9/2008 | Lau et al. | 715/840 |
| 2009/0189373 A1* | 7/2009 | Schramm et al. | 280/731 |
| 2010/0049434 A1* | 2/2010 | Liu | 701/209 |
| 2013/0050131 A1* | 2/2013 | Lee et al. | 345/174 |

FOREIGN PATENT DOCUMENTS

| | | |
|---|---|---|
| JP | 2004-252760 | 4/2004 |
| JP | 2004252760 A * | 9/2004 |
| JP | 2006-33094 | 2/2006 |
| JP | 2008-234667 | 10/2008 |
| JP | 2008234667 A * | 10/2008 |
| WO | WO 9935008 A1 * | 7/1999 |

\* cited by examiner

IN-VEHICLE INPUT SYSTEM

CROSS REFERENCE TO RELATED APPLICATION

This application is based on Japanese Patent Application No. 2010-124904 filed on May 31, 2010, the disclosure of which is incorporated herein by reference.

TECHNICAL FIELD

The present invention relates to an in-vehicle input system for inputting an operation instruction with using a display device.

BACKGROUND

In a vehicle such as an automotive vehicle, recently, an input system is described in JP-A-2004-252760. In the input system, a display device is disposed in front of a driver of the vehicle. The display device has a display screen, on which multiple selection regions as command switches are displayed. The driver operates a remote operation unit, which is disposed at a position different from the display device, so that the driver selects one of the selection regions with using a cursor. Thus, the driver can select and determine the operation instruction corresponding to the selected one of the selection regions. In such an input system, when the remote operation unit is disposed near a hand of the driver, for example, when the remote operation unit is arranged on a side of a driver seat, and the driver operates the unit without seeing the unit, the driver can operates the unit with keeping a driving posture. Thus, it is convenient for the driver to operate the unit.

The screen image of the display screen of the display device in the input system changes from a selection and determination screen image having the selection regions to a next step screen image when the driver selects and determines one of the selection regions. The input system repeats to change the screen image, and finally, the display device displays an object screen image. Then, the driver inputs an operation instruction on the object screen image so that an object operation is performed. The input system has this hierarchical structure. Thus, setting and changing operation of various control instructions can be executed.

However, in the in-vehicle input system, when the driver wants to return the screen image from the present one to the previous one, the driver operates "a return switch" which is different and independent from the remote operation unit, or the driver selects and determines "a return icon," which is displayed and fixed to a right upper area of the screen image, so that the screen image of the input system returns from the present step to the previous step. When the driver operates the return switch independently arranged from the remote operation unit, the driver has to find a position of the return switch, and check the return switch. Then, the driver operates the return switch. Thus, it is not convenient for the driver. Further, when the driver operates the return icon displayed on the right upper side of the screen image, it is necessary for the driver to move a cursor to the return icon as an object icon via one or more selection regions in turn. These operations are also not convenient for the driver.

SUMMARY

In view of the above-described problem, it is an object of the present disclosure to provide an in-vehicle input system for displaying hierarchical screen images. An user intuitively understands an operation to return the hierarchy, and easily executes the operation to return the hierarchy.

According to a first aspect of the present disclosure, an in-vehicle input system includes: a display device for displaying a plurality of selection screen images, which are switchable to each other, wherein each selection screen image includes a plurality of selection areas; a selection operation device for moving a cursor from one selection area to another adjacent selection area on one of the selection screen images along with an operation direction so that the another adjacent selection area is selected alternatively, and for inputting the selected another adjacent selection area; a first image switching device for switching from the one of the selection screen images to another one of the selection screen images when the another adjacent selection area on the one of the selection screen images is input by the selection operation device, wherein the another one of the selection screen images is a lower level selection screen image of the one of the selection screen images, and corresponds to the input another adjacent selection area; a second image switching device for switching from the one of the selection screen images to further another one of the selection screen images when the selection operation device selects and inputs a side area of the another adjacent selection area under a condition that the another adjacent selection area is selected, wherein the side area is disposed on a nearest screen edge side of the selected another adjacent selection area, and the further another one of the selection screen images is a upper level of the one of the selection screen images, and corresponds to the input side area; and a level return operation direction display device for emphasizing visually and displaying the side area as a level return operation direction display area under the condition that the another adjacent selection area is selected by the selection operation device, wherein the side area is emphasized compared with a case where the another adjacent selection area is not selected.

In the above case, the user can intuitively understands the operation to return the hierarchy, and easily executes the operation to return the hierarchy.

According to a second aspect of the present disclosure, an in-vehicle input system includes: a display device for displaying a plurality of screen images, which are switchable to each other, wherein each screen image includes a plurality of selection items, the screen images provides a hierarchical structure having an upper level screen image, a current level screen image and a lower level screen image, and the selection items includes a first selection item and a second selection item; a selection operation device for moving a cursor from the first selection item to the second selection item on the current level screen image along with an operation direction so that the second selection item is selected alternatively, and for inputting the selected second selection item; a first image switching device for switching from the current level screen image to the lower level screen image when the selected second selection item on the current level screen image is input, wherein the lower level screen image corresponds to the input second selection item; a second image switching device for switching from the current level screen image to the upper level screen image when the selection operation device selects and inputs a level return item of the selected second selection item under a condition that the second selection item is selected, wherein the level return item is disposed on a nearest screen edge side of the selected second selection item, and the upper level screen image corresponds to the level return item; and a level return item display device for emphasizing a display of the level return item when the second selection item is selected by the selection operation device, wherein the display of the level return item is emphasized compared with a case where the second selection item is not selected.

In the above system, the operation direction of the level return item directs to the outside of the screen image. Thus, the user can intuitively understands the operation to return the hierarchy, and easily executes the operation to return the hierarchy.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
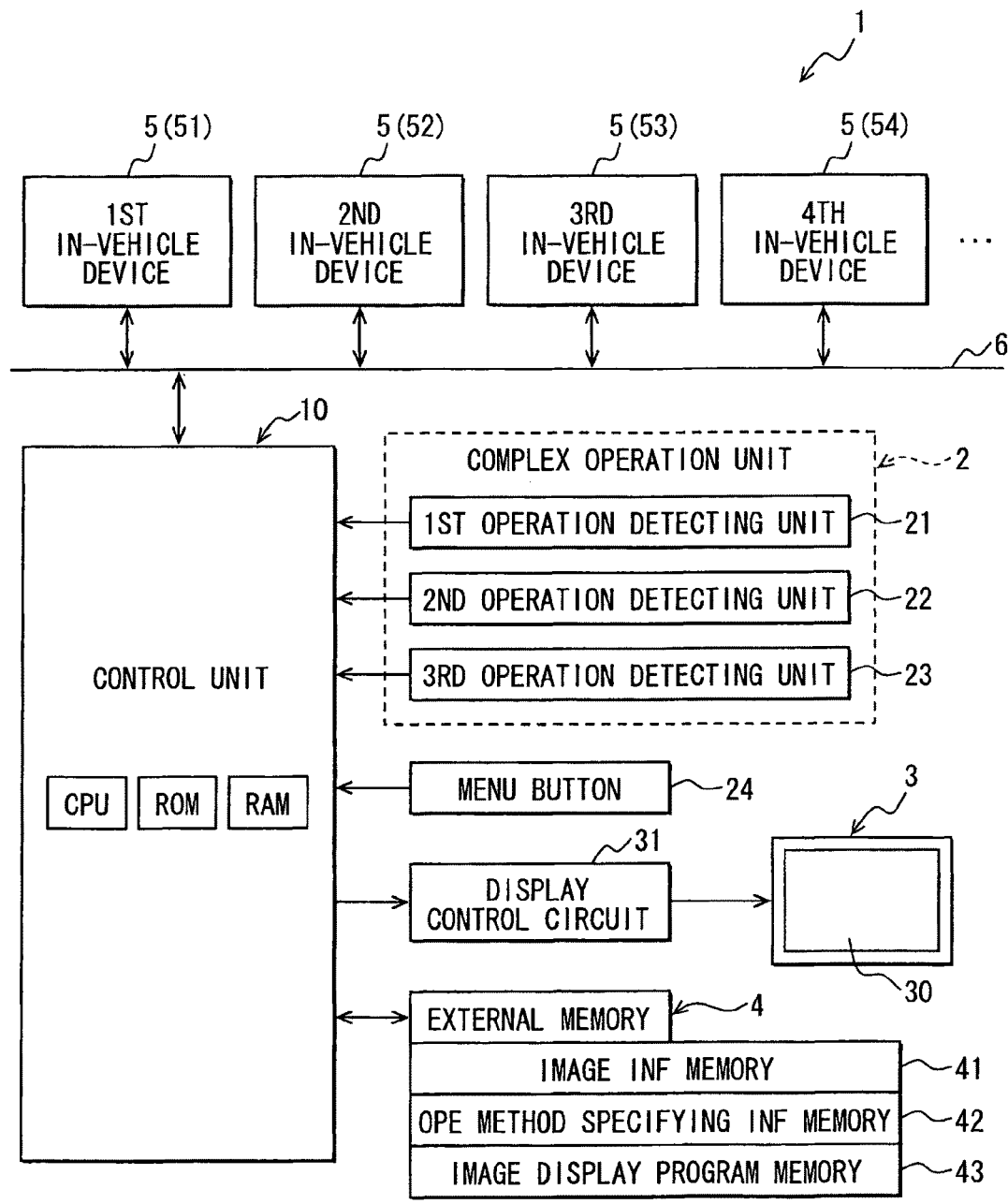
FIG. 1 is a block diagram showing an in-vehicle input system.

FIG. 1 is a block diagram showing an in-vehicle input system 1. The system 1 includes a display device 3, a control unit 10 as a main display control unit for controlling the display device 3 as a display element to display a selection screen image 500 having multiple selection regions as command switches on a display screen 30; and a complex operation unit 2 as a selection operation element for selecting, determining and inputting one of multiple selection regions 3A on the selection screen image 500.

The display device 3 is a conventional liquid crystal display device for displaying a still image and a moving image. The display device 3 is connected to the control unit 10 via the display control circuit 31. The display device 3 is driven according to a display driving signal output from the control unit 10. Further, various switches are arranged on a periphery of the display device 3. For example, a menu switch 24 and the like are arranged around the display device 3. Each switch is connected to the control unit 10 via a signal input unit (not shown). An operation signal corresponding to an operation of the switch is input into the control unit 10. When the menu switch 24 is operated, the screen image of the display screen 30 on the display device 3 is switched to a top menu screen image 502.

Figure 2:
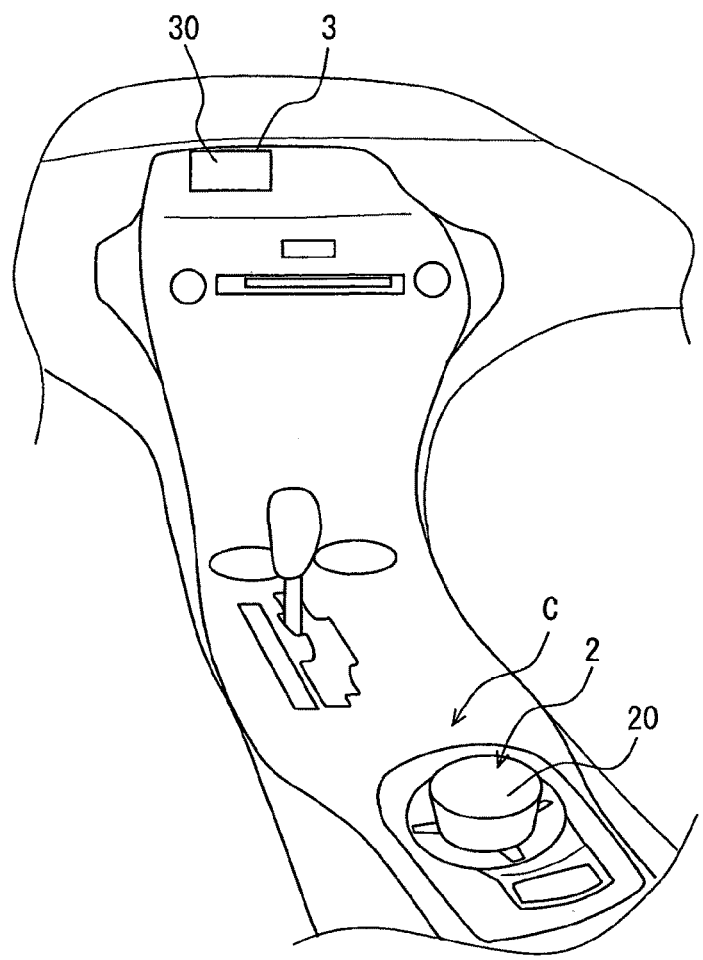
FIG. 2 is a diagram showing a compartment of a vehicle, in which the input system is mounted.
Figure 3:
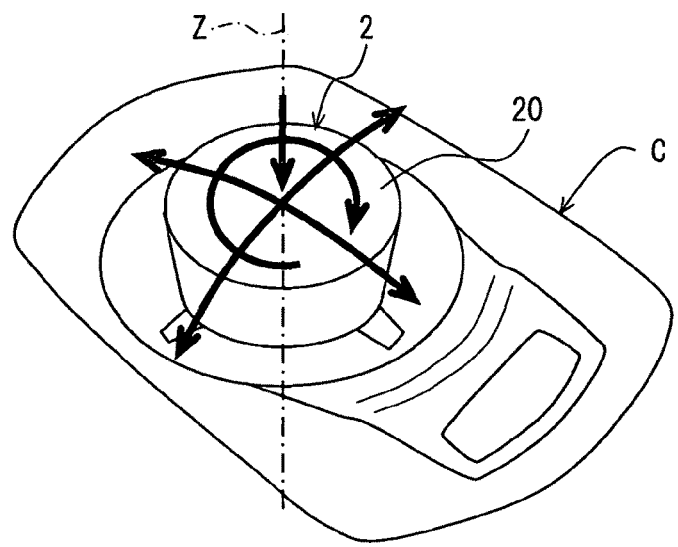
FIG. 3 is a diagram showing an operation unit in the input system.
Figure 4A:
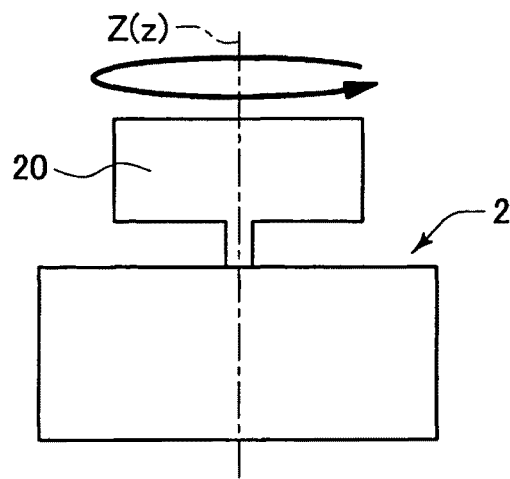
FIGS. 4A to 4C are diagrams showing various operation methods of the operation unit.
Figure 4B:
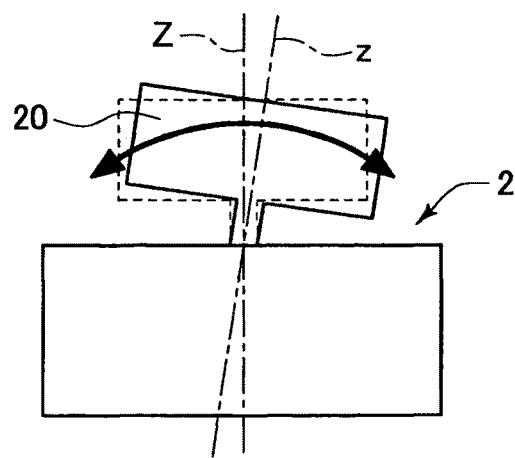
Figure 4C:
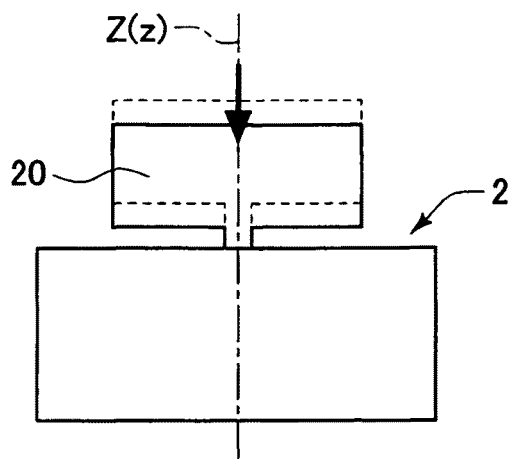

The complex operation unit 2 provides operations of different operation methods, which are independently performed. As shown in FIG. 2, the operation unit 2 is arranged at a position different from the display screen 30 of the display device 2. The operation unit 2 provides a remote operation element for remote-inputting an operation with respect to the selection regions 3A displayed on the display screen 30. The operation unit 2 is capable of accepting multiple operations having different types (i.e., methods or modes) of operations. Each operation of a corresponding type of operation defines an operation along with a certain direction. Here, as shown in FIG. 3, one operation knob 20 as an operation body provides three different types of operations. An operation direction of one type of operations is different from another operation direction of another type of operations. Specifically, as shown in FIGS. 4A to 4C, multiple types of operations of the operation knob 20 includes a rotation operation type shown in FIG. 4A such that a user rotates the knob 20 around an axis z of the knob 20, a displacing operation type shown in FIG. 4B such that the user moves the axis z of the knob 20 toward a direction perpendicular to a standard axis Z from an initial position as a standard position, and a pressing operation type shown in FIG. 4C such that the user presses the knob 20 in the standard axis Z. The standard position of the knob 20 is arranged in the standard axis Z as a preliminary determined standard axis.

In the operation of the displacing operation type defined as displacing operation, the user moves the knob 20 in a certain moving operation direction, which is selected by the user among multiple moving operation directions. The knob 20 is guided to be displaceable only along with the moving operation directions. In this embodiment, the moving operation directions are four so that four directions provide a cross shape, which is perpendicular to the standard axis Z. Thus, the displacing operation is a cross direction operation as a cross operation type so that the user moves the knob 20 from the standard position toward four directions, which provide the cross shape. Here, in the displacing operation, the user moves the knob 20 along with a direction perpendicular to the standard axis Z. Therefore, the user may move the knob 20 from the standard position with maintaining the axis z of the knob 20 to be in parallel to the standard axis Z. This operation is defined as a parallel displacing operation. Alternatively, the user may move the knob 20 from the standard position with tilting the axis z of the knob 20 with respect to the standard axis Z. This operation is defined as a tilting operation.

The operation unit 2 provides the cross operation unit so that the user can move the knob 20 in one of four directions, which include a front-rear direction of the vehicle and a right-left direction of the vehicle. The front-rear direction of the operation directions corresponds to an up-down direction of the display screen 30 of the display device 3. The right-left direction of the operation directions corresponds to a right-left direction of the display screen 30 of the display device 3.

The operation unit 2 includes a biasing means such as a spring or a reaction force applying means such as a reaction force motor for applying the operation reaction force to the knob 20 so that the operation unit 2 is normally held at the standard position, i.e., a neutral position. Three operation detection units 21-23 for detecting various operations to the knob 20 are accommodated in a casing of the operation unit 2. The first operation detection unit 21 is a rotational operation detection unit 21 for detecting the rotation operation of the knob 20 and for electrically calculating a rotational operation amount. The second operation detection unit 22 is a displacing operation detection unit 22 for detecting the displacing operation of the knob 20. The third operation detection unit 23 is a pressing operation detection unit 23 for detecting the pressing operation to the knob 20. These operation detection units 21-23 are connected to the control unit 10 via a signal input unit (not shown), respectively, so that an operation signal corresponding to the operation is input into the control unit 10.

The complex operation unit 2 providing multiple operation types with using one operation knob 20 is described in, for example, JP-A-2009-176432 and JP-A-2009-064638.

The control unit 10 includes a micro computer having a CPU, a ROM, a RAM and the like, which are not shown. The CPU executes a program stored in the ROM and an external memory device 4 so that various control steps are executed. The control unit 10 is connected to a control unit of another in-vehicle device via an in-vehicle LAN 6, so that data and a control signal are transmitted and received between the control unit 10 and the other in-vehicle device.

Based on the operation signal input from the operation detection units 21-23, the control unit 10 functions as a control executing means for executing the control corresponding to the operation signal. For example, the complex operation unit 2 controls a navigation device 51, an in-vehicle air conditioning device 52, an in-vehicle audio device 53 and other in-vehicle device 54, which are coupled with the complex operation unit 2 via the in-vehicle LAN 6, to perform various function according to the operation to the complex operation unit 2.

The external memory device 4 connected to the control unit 10 includes an image information memory unit 41 for storing image information, which provides an image to be displayed on the display screen 30. The control unit 10 reads the image information at a certain timing, and based on the image information, the control unit 10 controls the display device 3 to display the image on the display screen 30. The image information memory unit 41 stores the image information for each image to be displayed on the screen 30. The image information memory unit 41 stores various image information in association with images. For example, the image information for displaying the selection screen image 500 includes background image information for displaying the background image 3B, input image information for displaying and overlapping multiple input images 3C over the background image 3B, auxiliary image information for displaying an auxiliary image 3D, which represents operation types visually on the selection screen image 500 so that the user can input one operation of the operation types, and the control unit 10 can receives the input of the user, image information for displaying a return image 3E, and other information for displaying various necessary images such as an overlapping image 3F in a selection area, a background image 3G in the selection area, and a display method for the cursor 3P.

The external memory device 4 includes an operation type specifying information memory unit 42, which stores operation type specifying information in each of multiple selection screen images. When the selection screen image 500 is displayed according to the image information, the operation type specifying information provides to specify the operation type of selected operation, which can receive the input operation in the complex operation unit 2. The control unit 10 reads out the operation type specifying information corresponding to selected area every time when the screen image is switched or when the selected selection area 3A is switched to another selection area 3A. The control unit 10 specifies and sets the operation type corresponding to the current display screen.

The control unit 10 controls the display device 3 to display the input image 3C at predetermined multiple areas and overlapping the image 3C over the background image 3B corresponding to the display screen 30 so that the area, on which the input image 3C is displayed, functions as the selection screen area 3A when the selection screen image 500 is displayed on the display screen 30 of the display device 3. When the user operates and selects one of the selection areas 3A (i.e., the input images 3C) with using the complex operation unit 2, and the user inputs and determines the selected selection area 3A, the control unit 10 executes the control corresponding to the selected selection area 3A. The image data of the background image 3B and the input image 3C, and the arrangement information of the image data (i.e., the setting information of the selection area) are stored as a part of the image information in the external memory device 4.

Here, in the selection operation for selecting the selection area 3A, the user moves the cursor 3P to the selection area 3A. Specifically, in the selection screen image 500 displayed on the display screen 30, the cursor 3P is moved in turn to a side corresponding to the moving operation direction of the operation knob 20 in such a manner that the cursor 3P is displaced from one selection area 3A to adjacent selection area 3A. Thus, one of the selection areas 3A is selected. The determining input operation may be executed at the same time as selection of the selection area 3A in the selection operation. Alternatively, under a condition that the selection area 3A is selected in the selection operation, another operation other than the selection operation may provide the determining input operation. Here, the control unit 10 provides the operation method of the complex operation unit 2 for executing the selection operation such as the rotation operation method and the displacing operation method, and the operation method of the complex operation unit 2 for executing the determining input operation such as the pressing operation method, according to various display images and based on the operation type specifying information. When the cursor 3P is disposed on the selected selection area 3A, the cursor 3P emphatically shows the selected selection area 3A compared with other non-selected selection areas 3A. In the present embodiment, the image of the selected selection area 3A is enlarged.

In the present embodiment, in order to easily understand the operation method of the complex operation unit 2 for selecting one of the selection areas 3A on the selection screen image 500, i.e., the operation method corresponding to the selection screen image 500, the auxiliary image 3D reflecting the operation motion line of the complex operation unit 2 corresponding to the operation method is displayed and overlapped over the background image 3B. Thus, when the selection screen image 500 is displayed, the user can understand with using the auxiliary image 3D displayed in accordance with the selected selection area 3A which operation method of the complex operation unit 2 provides the selection operation.

Figure 5:
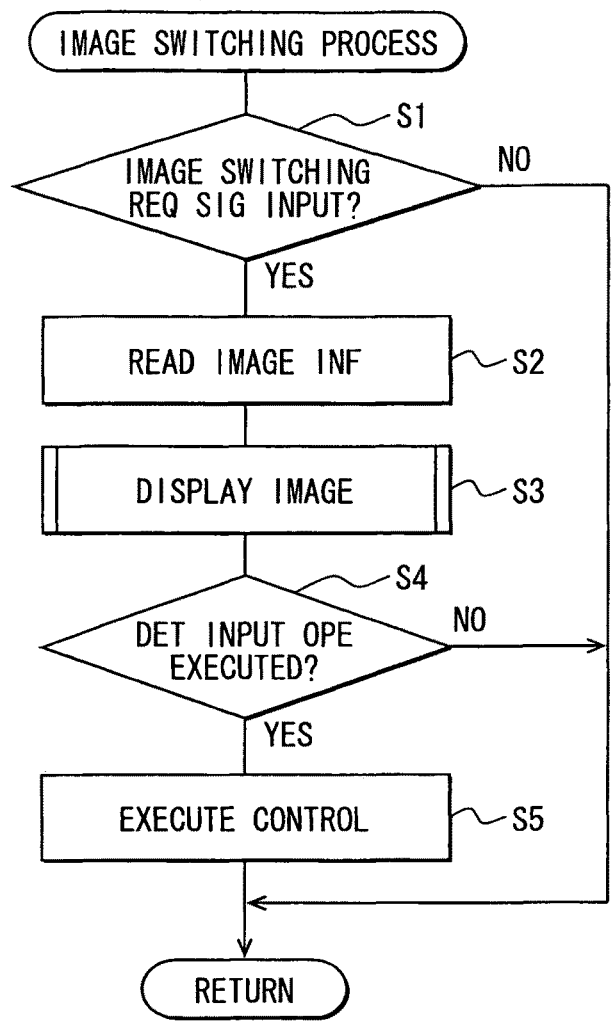
FIG. 5 is a flow chart showing a screen image switching process.

The image switching process executed by the control unit 10 will be explained with reference to FIG. 5. The process in FIG. 5 is repeatedly executed at predetermined intervals.

The control unit 10 executes an image display program 43 stored in the external memory device 4. In step S1, the control unit 10 determines whether the image switching request signal is input from the complex operation unit 2, other operation units or an external operation unit. When the image switching request signal is input, i.e., when the determination in step S1 is "YES," it goes to step S2. In step S2, the control unit 10 reads the image information corresponding to the image, which is requested by the image switching request signal, from the image information memory unit 41. Then, in step S3, the control unit 10 executes to display the image on the display device 3 according to the image information. Then, the control unit 10 determines whether the user performs the determining input operation to the selection area. Specifically, when the image to be displayed is the selection screen image 500, multiple selection areas 3A are displayed on the image 500. When the user selects one of the selection areas 3A with using the complex operation unit 2, and then, the user performs the determining input operation with respect to the selected selection area 3A, the determination in step S4 is "YES." In this case, it goes to step S5. In step S5, the control unit 10 executes the control corresponding to the selection area 3A, which is determined and input in step S4. When the selection area 3A determined and input in step S4 is an image switching area 3a, which provides to switch the image from the current display image to a predetermined lower level image, an output signal output from the complex operation unit 2 to the control unit 10 based on the determining input operation is the image switching request signal. Thus, the control unit 10 executes the control for switching from the current image to the lower level image corresponding to the image switching area 3a, which is determined and input in step S4, according to the image switching request signal. In this case, the control unit 10 functions as a first image switching means. The lower level image, which is switched from the current image, is also the selection screen image 500. When the selection areas 3A in the lower level image include an image switching area 3a, and the user selects, determines and inputs the image switching area 3a with using the complex operation unit 2, a further lower level image corresponding to the image switching area 3a is displayed. In the present embodiment, the screen images in the hierarchy structure are displayed.

When the screen images in the hierarchy structure are displayed, it is necessary to return from a lower level image to an upper level image. Conventionally, the user has to operate "a return switch," which is independently arranged from the remote operation unit, so that the lower level image is returned to the upper level image. Alternatively, the user has to select and input "a return image switch," which is displayed and fixed to a right upper portion of the screen, so that the lower level image is returned to the upper level image. However, when the user operates "the return switch," which is arranged on a different position, the user has to find the position of the return switch. Thus, it takes much time to find the return switch. Further, when the user has to operate the return image switch displayed and fixed on the screen, the user has to move the cursor from a current position to the position of the return image switch. Accordingly, these operations are not convenient for the user. Specifically, when the driver of the vehicle operates the return switch or the return image switch, it is preferred for the driver to reduce the operation load. Thus, in the present embodiment, after the selection area 3A is selected but not determined and input, the user can operate to return from the lower level image to the upper level image with a simple and easy operation. Further, the user can intuitively understand that the simple and easy operation provides to return the level. Specifically, the operation direction for the simple and easy operation is clearly defined and shown. Thus, the conventional art difficulty is improved.

Specifically, under a condition that the selection screen image 500 in the lower level, which shows an operation for returning to the selection screen image 500 in the upper level, is displayed, when the user selects one of the selection areas 3A displayed in the image 500 of the lower level with using the complex operation unit 2, and the user selects a side directing toward a screen edge 510 from the selected selection area 3A so that a level return operation is determined and input, the complex operation unit 2 outputs the image switching request signal to the control unit 10 based on the determining and inputting operation. The screen edge 510 is the nearest edge from the selection area 3A on the screen, and the side directing toward the screen edge 510 provides a direction to the outer periphery of the screen. Then, the control unit 10 executes the control for switching from the lower level selection screen image 500 to the upper level selection screen image 500 corresponding to the image switching area 3a, which is determined an input, based on the image switching request signal. Here, in this case, the upper level selection screen image 500 is an upper level image from the currently displayed selection screen image 500. In this case, the control unit 10 functions as the second image switching means.

In the above case, the operation of the knob 20 such that the knob 20 is moved to the nearest screen edge of the selected selection area 3A is defined as the level return operation for returning to the upper level image in the lower level selection screen image 500. Specifically, the operation for moving from the current level to the lower level is defined as the operation of the knob 20 such that the selection area 3A disposed on the current selection screen image 500 is selected and determined with using the knob 20. The operation for moving from the current level to the upper level is defined as the operation of the knob 20 such that the cursor 3P is moved toward the outside of the screen image, which is different from the operation of the knob 20 to select the selection area 3A. In this case, the cursor 3P is moved from the inside of the image to the outside of the image, i.e., moved a part from the image. Accordingly, the operation for returning to the upper level image gives an impression for the user to move a part from the current image. Specifically, the operation for switching from the current level image to the upper level image is easily and intuitively connected to the impression such that the current screen image is removed, and returned to the upper level screen image as a return image. Accordingly, the operation for returning to the upper level screen image is intuitively connected to the recognition of returning operation from the currently displayed level screen image to the upper level screen image, according to the operation direction.

In the present embodiment, the operation for selecting, determining and inputting the level return operation for returning to the upper level image with using the complex operation unit 2 is performed such that the determining and inputting operation is performed by the pressing operation method after the selection operation is performed by the displacing operation method and/or the rotation operation method. Alternatively, for example, the determining and inputting operation may be performed at the same time as the selection operation by the displacing operation method and/or the rotation operation method.

The level return operation in the present embodiment is performed such that the selection area 3A disposed on the screen edge side from the selected selection area 3A (i.e., the selection area 3A disposed between the selected selection area 3A and the nearest screen edge) is selected, determined and input. Alternatively, the level return operation may be performed such that the operation for selecting, determining and inputting is performed without no selection area 3A between the selected selection area 3A and the nearest screen edge.

When the lower level selection screen image 500 is displayed, and the selection area 3A is selected with using the complex operation unit 2, the level return operation direction display region 3R disposed on the nearest edge side from the selected selection area 3A is emphasized and displayed visually compared with a case where the selection area 3A is not selected. Here, the level return operation direction display region 3R is dispose between the selected selection area 3A and the nearest screen edge 510. In this case, the control unit 10 functions as a level return operation direction display means. Thus, the operation direction of the operation for returning to the upper level image is emphasized and displayed.

The level return operation direction display region 3R is displayed on the outside of the lower level selection screen image 500. For example, the level return operation direction display region 3R may be disposed on the outside of the display screen 30 of the display device 3. Alternatively, the level return operation direction display region 3R may be provided by a light emitting element such as a LED. Alternatively, the level return operation direction display region 3R may be displayed in the screen image on the display screen 30.

In the present embodiment, the level return operation direction display region 3R is displayed as the return image 3E on the lower level selection screen image 500. Specifically, the level return operation direction display region 3R on the lower level selection screen image 500 is an image periphery region (i.e., screen edge region) 511 on the nearest edge side from the selected selection area 3A. The return image 3E is displayed in the image periphery region 511. The return image 3E in the present embodiment includes at least one of a screen outside indication diagram for indicating the screen edge 510, which is the nearest edge of the selected selection area 3A, and a string of letters for representing the return operation to the upper level image. The screen outside indication diagram has a direction, which is provided by the diagram, and is specified in accordance with the position of the selection area 3A.

The image periphery region 511 is a near field region of the screen edge 510 in the selection screen image 500. Specifically, the image periphery region 511 is disposed in an outer periphery neighboring region in the selection screen image 500. The level return operation direction display region 3R corresponding to each selection area 3A is disposed in the screen edge region 511 on the nearest screen edge side from the selection area 3A. The level return operation direction display region 3R corresponding to the selection area 3A is preliminary determined. The information showing the relationship between the level return operation direction display region 3R and the selection area 3A is stored as a part of the image information in the external memory device 4. The control unit 10 recognizes the level return operation direction display region 3R corresponding to the selection area 3A and the screen edge region 511 as the display region based on the information showing the relationship, so that the control unit 10 sets the level return operation direction display region 3R and controls to display the return image 3E.

The level return operation direction display region 3R in the present embodiment is set to be disposed in the screen edge region 511 corresponding to the selected selection area 3A. When the user selects another selection area 3A, the control unit 10 sets a new level return operation direction display region 3R corresponding to the newly selected selection area 3A. Specifically, when the selection area 3A is not selected, the level return operation direction display region 3R is not set, and therefore, the return image 3E is not displayed. When the selection area 3A is selected, the level return operation direction display region 3R corresponding to the selected selection area 3A is set, and therefore, the return image 3E is displayed. Thus, the return image 3E is emphasized visually, compared with a case where the selection area 3A is not selected.

In the present embodiment, the control unit 10 newly sets the level return operation direction display region 3R, which is emphasized by the return image 3E, as the selection area 3A on the selection screen image 500 representing the return operation to the upper level image. Thus, the level return operation direction display region 3R can be selected by the user with using the complex operation unit 2. In this case, the control unit 10 functions as a level return selection region setting means. When the level return operation direction display region 3R set as the selection area 3A is selected, determined and input by the operation of the complex operation unit 2, the determination in step S4 is "YES." In this case, it goes to step S5. In step S5, the control unit 10 executes the switching control for switching from the currently displayed screen image 500 to a predetermined selection screen image 500 as the upper level image.

The selection screen image 500 is displayed on a whole of the display screen 30 of the display device 3. Alternatively, the selection screen image 500 may be displayed in a part of the display screen 30.

Figure 6:
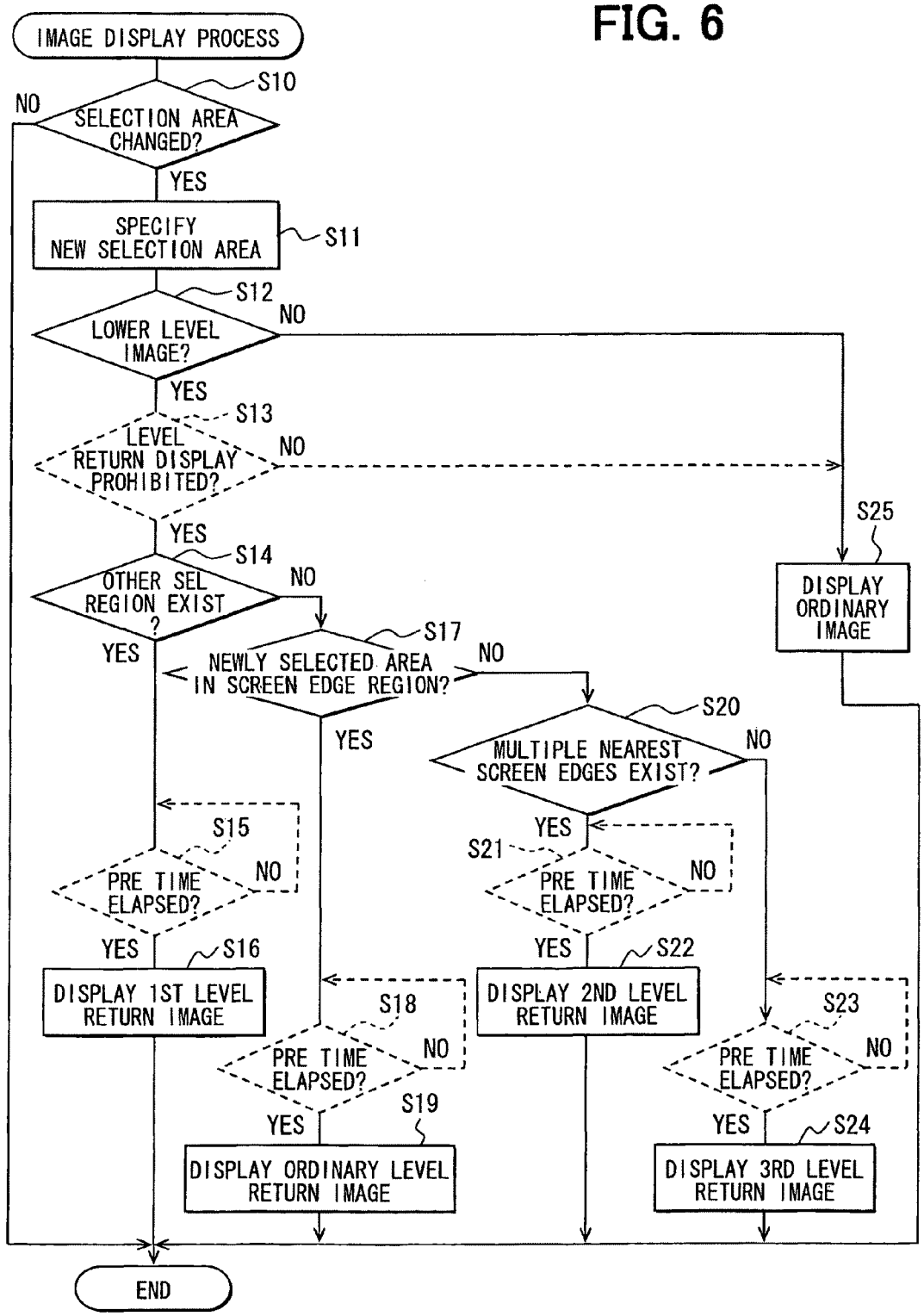
FIG. 6 is a flow chart showing a screen image display process.

Here, the image display process corresponding to step S3 of the image switching process in FIG. 5 will be explained with reference to FIG. 6. The image display process is executed by the control unit 10. The image display process is repeatedly executed at predetermined intervals.

In step S10, the control unit 10 determines whether the selected selection area 3A is changed. Specifically, the unit 10 determines whether the selection area 3A selected by the cursor 3P is changed. When the selection area 3A is not changed, i.e., when the determination in step S10 is "NO," the image display process ends. When the selection area 3A is changed, i.e., when the determination in step S10 is "YES," it goes to step S11. In step S11, a newly selected selection area 3A is specified. Further, in step S12, the control unit 10 determines whether the currently displayed screen image is a lower level screen image including the selection screen image 500 for the upper level.

When the current image is not the lower level image, i.e., when the determination in step S12 is "NO," for example, when the current image is disposed on the top level image (e.g., the image shown in FIG. 8), in step S25, the control unit 10 controls the display device 3 to display the ordinary image on the display screen 30 according to the image information to be displayed. Further, the control unit 10 controls the display device 3 to display the cursor 3P with respect to the newly selected selection area 3A.

When the currently displayed image is the lower level image (e.g., the images in FIGS. 9 to 15), i.e., when the determination of step S12 is "YES," it goes to step S14. In step S14, the control unit 10 determines whether other selection areas 3A exists in the screen edge region 511 on the nearest edge 510 from the newly selected selection region 3A.

When other selection areas 3A is disposed in the screen edge region 511 corresponding to the newly selected selection area 3A, i.e., when the determination of step S14 is "YES," it goes to step S16. In step S16, the control unit 10 controls the display device 3 to shift the other selection areas 3A to a position in the selection screen image 500, which is different from the screen edge region 511. Further, the control unit 10 sets the level return operation direction display region 3R corresponding to the newly selected selection area 3A in the screen edge region 511. Furthermore, the control unit 10 controls the display device 3 to display the return image 3E in the level return operation direction display region 3R. The return image 3E corresponds to a screen image shown in FIG. 12. Thus, in step S16, the first level return image is displayed.

When the other selection area 3A is not disposed in the screen edge region 511 corresponding to the newly selected selection region 3A, i.e., when the determination of step S14 is "NO," it goes to step S17. In step S17, the control unit 10 determines whether the newly selected selection area 3A is disposed in the screen edge region 511. When the newly selected selection area 3A is disposed in the screen edge region 511, i.e., when the determination of step S17 is "YES," it goes to step S19. In step S19, the control unit 10 controls the display device 3 to shift the newly selected selection area 3A to a position in the selection screen image 500, which is different from the screen edge region 511. Further, the control unit 10 sets the level return operation direction display region 3R corresponding to the newly selected selection area 3A in the screen edge region 511.

Figure 9:
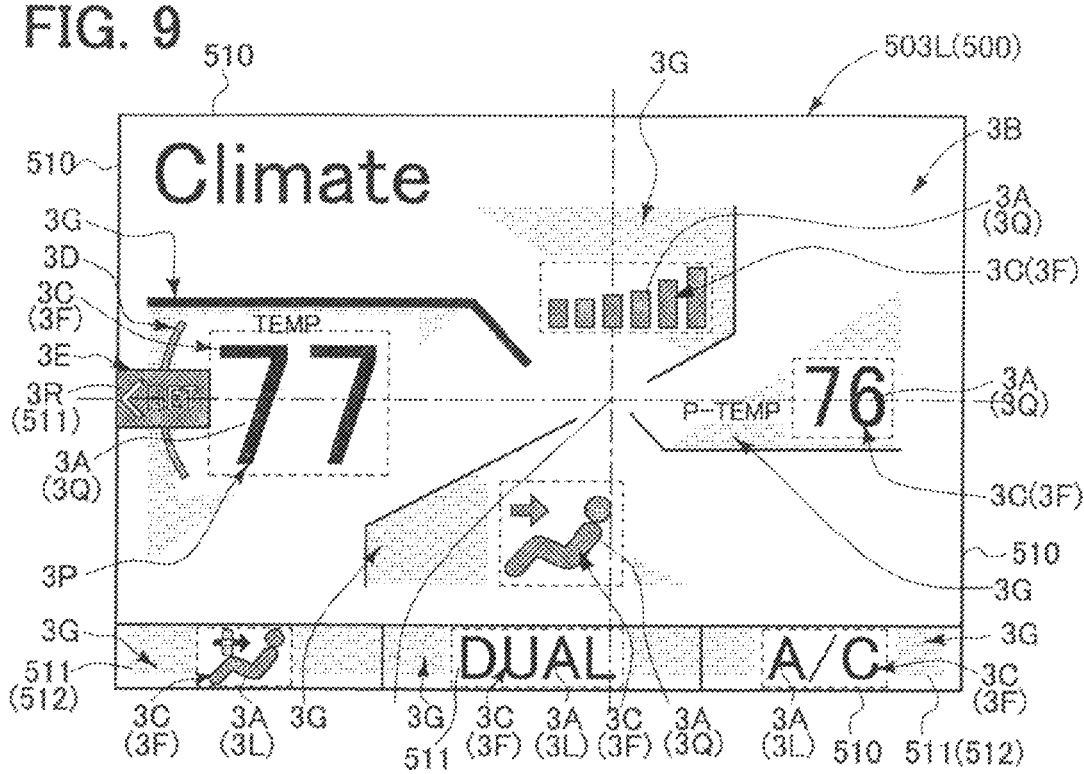
FIG. 9 is a diagram showing a selection screen image of a lower hierarchy of the screen image in FIG. 8 after one selection region in the screen image in FIG. 8 is selected.
Figure 10:
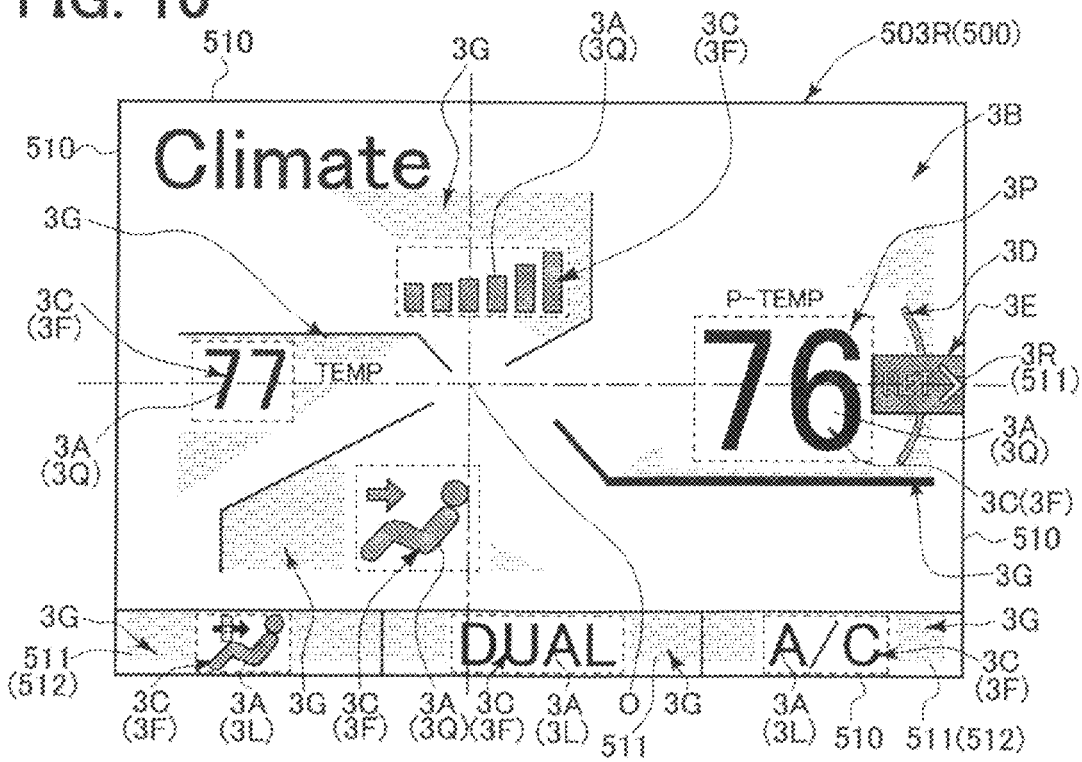
FIG. 10 is a diagram showing a selection screen image of the lower hierarchy of the screen image in FIG. 8 after the one selection region in the screen image in FIG. 8 is selected, and a selection region in FIG. 10 is different from a selection region in FIG. 9.
Figure 11:
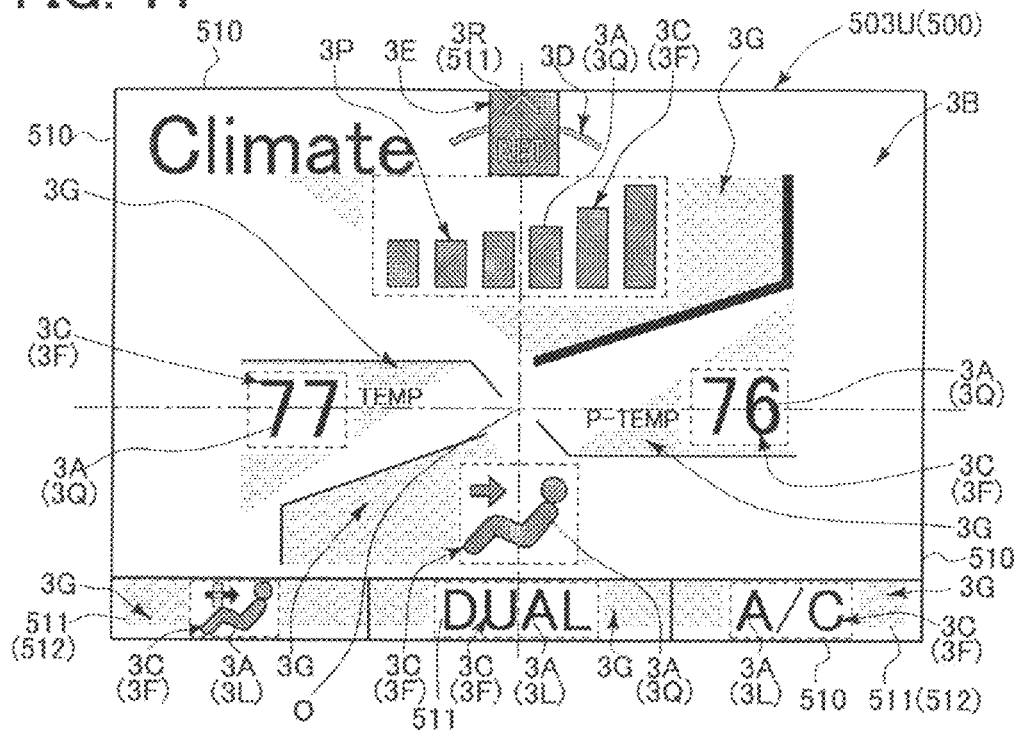
FIG. 11 is a diagram showing a selection screen image of the lower hierarchy of the screen image in FIG. 8 after the one selection region in the screen image in FIG. 8 is selected, and a selection region in FIG. 11 is different from the selection regions in FIGS. 9 and 10.

Thus, in step S19, an ordinary level return image is displayed, as shown in FIGS. 9 to 11.

Figure 13:
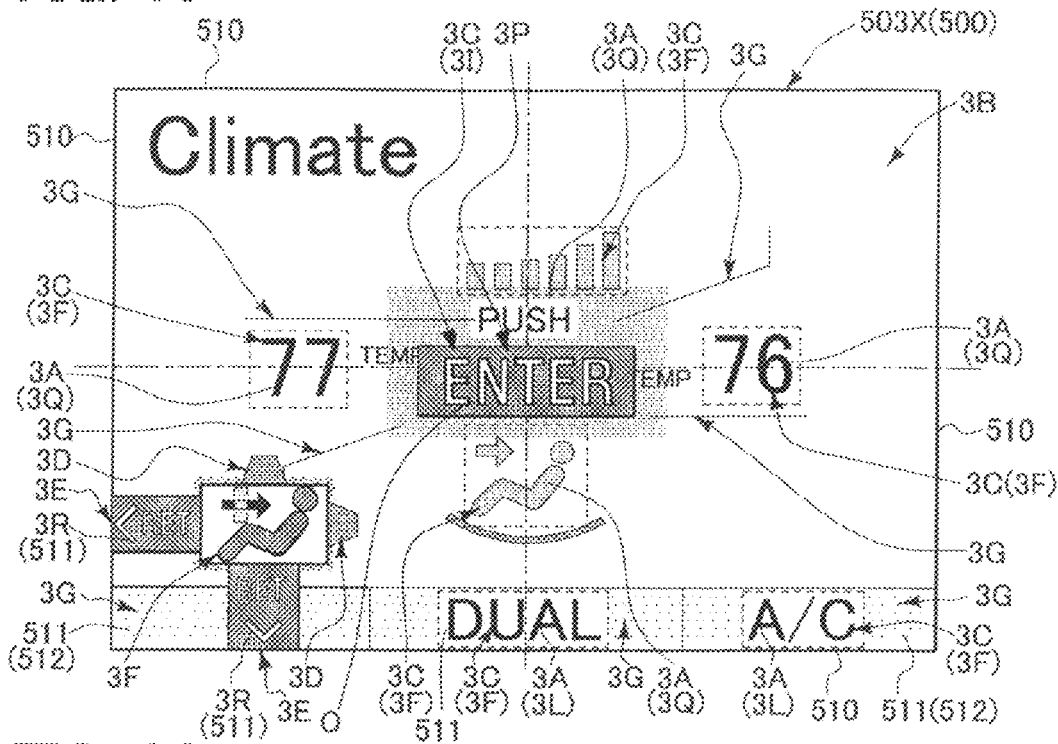
FIG. 13 is a diagram showing a selection screen image of the lower hierarchy of the screen image in FIG. 8 after the one selection region in the screen image in FIG. 8 is selected, and a selection region in FIG. 13 is different from the selection regions in FIGS. 9 to 12.
Figure 14:
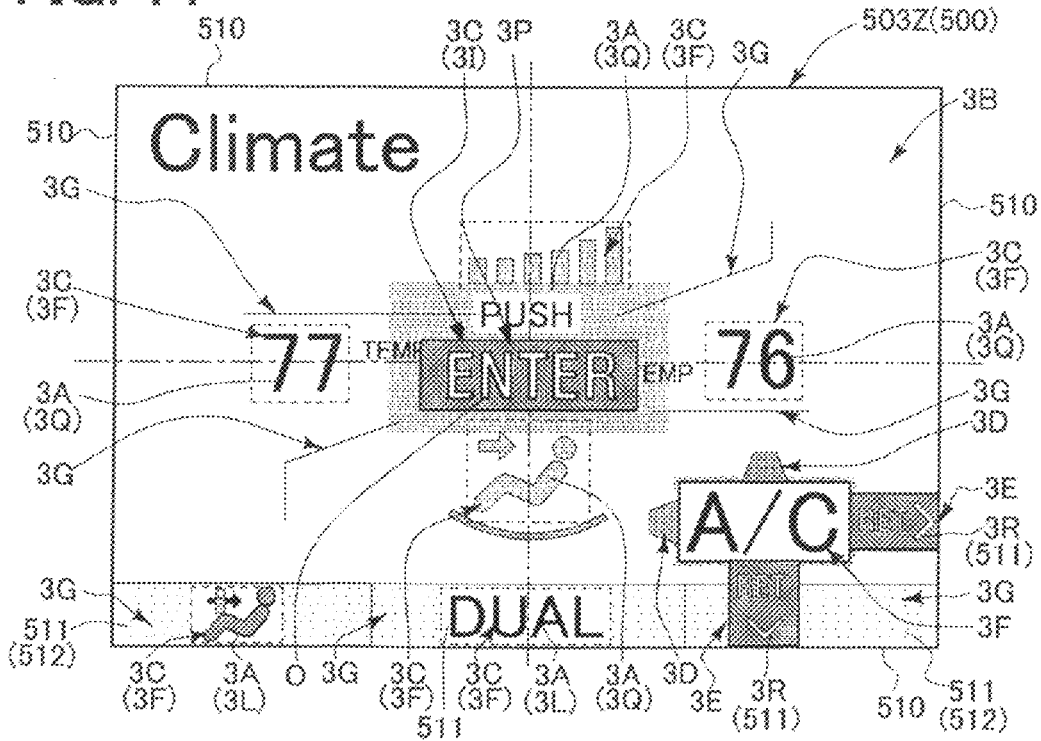
FIG. 14 is a diagram showing a selection screen image of the lower hierarchy of the screen image in FIG. 8 after the one selection region in the screen image in FIG. 8 is selected, and a selection region in FIG. 14 is different from the selection regions in FIGS. 9 to 13.
Figure 15:
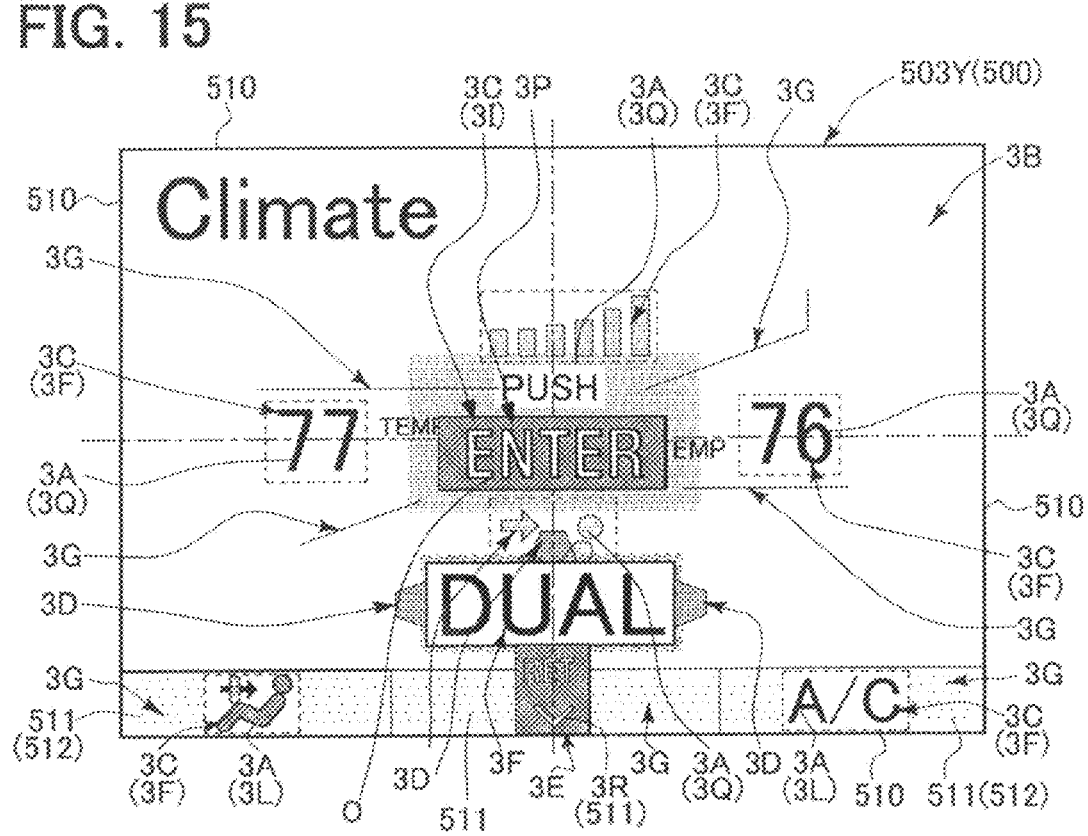
FIG. 15 is a diagram showing a selection screen image of the lower hierarchy of the screen image in FIG. 8 after the one selection region in the screen image in FIG. 8 is selected, and a selection region in FIG. 15 is different from the selection regions in FIGS. 9 to 14.

When the newly selected selection area 3A is not disposed in the screen edge region 511, i.e., when the determination of step S17 is "NO," it goes to step S20. In step S20, the control unit 10 determines whether multiple nearest screen edges 510 from the newly selected selection area 3A exist. When there are multiple nearest screen edges 510 from the newly selected selection area 3A, i.e., when the determination of step S20 is "YES," it goes to step S22. In step S22, the control unit 10 sets the level return operation direction display region 3R in each screen edge 510. Further, the control unit 10 controls the display device 3 to display the return image 3E corresponding to each level return operation direction display region 3R. Thus, in step S22, a second level return image is displayed, as shown in FIGS. 13 and 14. When there are not multiple nearest screen edges 510 from the newly selected selection area 3A, i.e., when the determination of step S20 is "NO," it goes to step S24. In step S24, the control unit 10 sets the level return operation direction display region 3R on the screen edge side. Further, the control unit 10 controls the display device 3 to display the return image 3E corresponding to the level return operation direction display region 3R. Thus, in step S24, a third level return image is displayed, as shown in FIG. 15.

Examples of the images displayed on the display screen 30 having a rectangular shape in the display device 3 according to the present embodiment will be explained with reference to FIGS. 7 to 15.

Figure 7:
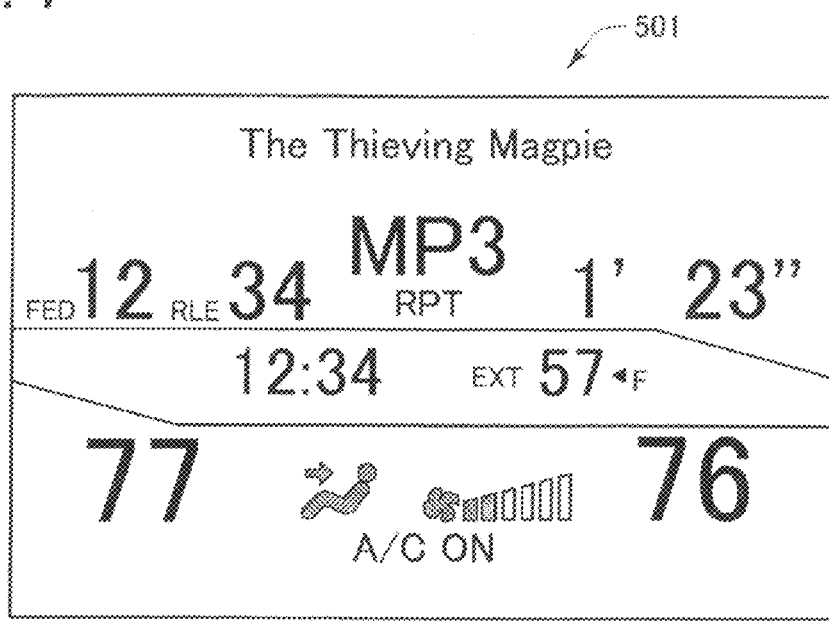
FIG. 7 is a diagram showing a screen image of a current status in the input system.

FIG. 7 shows the current status display image 501, which represents the vehicle information such as the current control status and the detection information of various in-vehicle devices. In FIG. 7, replay information of an audio device, setting information of an air conditioning system, and time information of a clock are displayed. When the current status display image 501 is displayed, and the user executes one of operation to the menu switch 24 and operation to the complex operation unit 2, the control unit 10 controls the display device 3 to switch the display image from the current status display image 501 to a top menu image 502 shown in FIG. 8.

Figure 8:
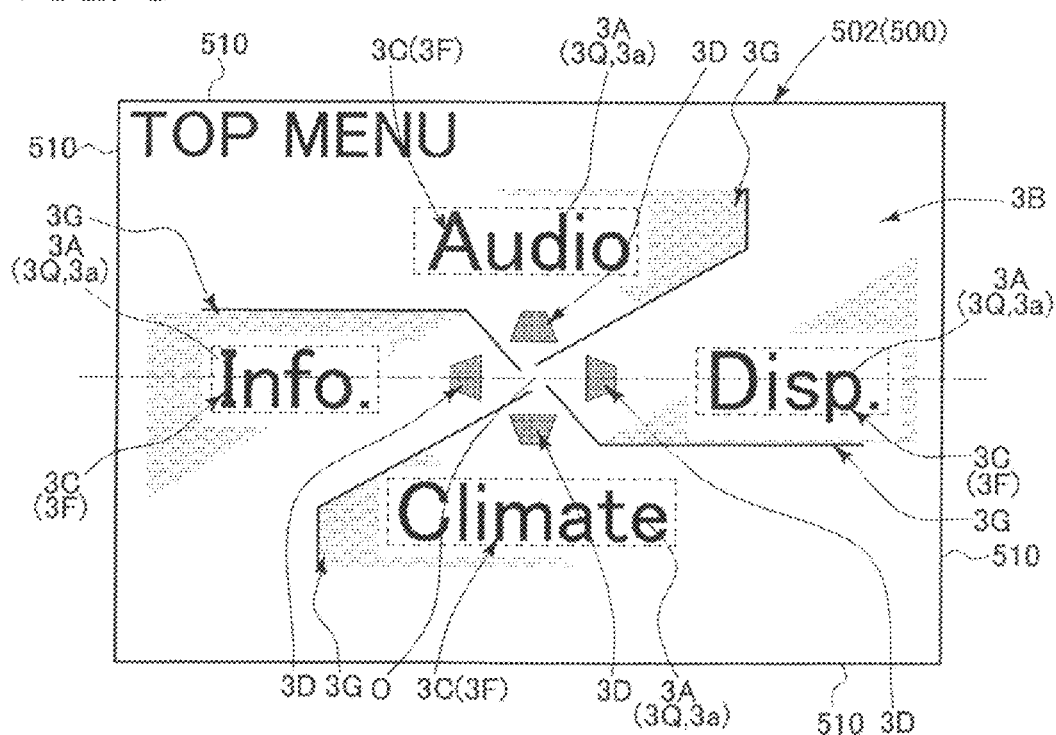
FIG. 8 is a diagram showing a selection screen image of an upper hierarchy in the input system.

The top menu image 502 in FIG. 8 is the selection screen image 500 having the rectangular shape. The selection screen image 500 includes a ring shaped selection area group 3Q having multiple selection areas 3A, which are arranged in a ring shape manner at predetermined intervals along with a circumferential direction around a predetermined reference point O. Here, the selection areas 3A are arranged around the reference point O as a center in such a manner that four areas 3A are arranged in a cross shape, i.e., arranged on an upper side, a lower side, a right side and a left side of the reference point O. In FIG. 8, the cursor 3P shown as the selected selection area 3A in an enlarged display manner does not select any selection area 3A. Thus, the complex operation unit 2 is disposed at a neutral position.

When the top menu image 502 is displayed, the operation method for selecting the selection area 3A is set to be the displacing operation method. The auxiliary image 3D showing the operation motion line of the complex operation unit 2 according to the displacing operation method is displayed and overlapped over the background image 3B on a whole of the screen. Here, the operation method for determining and inputting the selected selection area 3A is set to be the pressing operation method. Alternatively, when one of the selection areas 3A is selected by the displacing operation method of the complex operation unit 2, the selected selection area 3A may be determined an input simultaneously without any operation.

When one of the selection areas 3A is selected by the displacing operation method of the complex operation unit 2, i.e., when the screen image is in a cursor select state, the input image 3C provided by the one of the selection areas 3A is displayed and emphasized visually, compared with a case where the input image 3C is not selected. Here, the image of the selection area 3A includes a background image 3G in the selection area 3A and an overlapping image 3F in the selection area 3A. The background image 3G is displayed as the background of the selection area 3A. The overlapping image 3F is displayed and overlapped over the background image 3G. In the top menu image 502 in FIG. 8, the overlapping image 3F is displayed and emphasized as the input image 3C. Here, the overlapping image 3F is a string of letters for representing the control to be executed when the selection area 3A is selected, determined and input. When the overlapping image 3F is selected, the overlapping image 3F is enlarged, and each letter of the overlapping image 3F is brightly displayed, compared with a case where the overlapping image 3F is not selected. The background image 3G is an ornamental image for decorating the background and around the letter string image 3F.

The top menu image 502 in FIG. 8 is the top level selection screen image (i.e., the highest level selection screen image) as an upper level screen image, which includes multiple selection areas 3A. The selection areas 3A includes at least one image switching area 3a for switching the screen image from the currently displayed image to a lower level screen image. In FIG. 8, all of the selection areas 3A disposed on the up side, the down side, the right side and the left side of the center are image switching areas 3a. For example, when the image switching area 3a disposed on the down side of the center is selected, determined and input, the image 503L in FIG. 9 corresponding to the image switching area 3a is displayed as the lower level screen image.

The image 503L in FIG. 9 is the lower level screen image of the top menu image 500 in FIG. 8. The image 503L is the selection screen image 500 including at leas one selection area 3A. However, in the image 503L, since the selection area 3A does not include the image switching area 3a, the image 503L is the bottom level image (i.e., the lowest level image). The image 503L is the selection screen image 500 having the rectangular shape. The image 503L includes a ring shape selection area group 3Q and a linear shape selection area group 3L. The ring shape selection area group 3Q includes multiple selection areas 3A, which are arranged in a ring shape manner. The linear shape selection area group 3L includes multiple selection areas 3A, which are arranged in a linear shape manner. In FIG. 9, the selection area 3A disposed on the left side of the image and belonging to the ring shape selection area group 3Q is selected by the cursor 3P.

In the image 503L in FIG. 9, the input image 3C provided by the selected selection area 3A is emphasized and displayed visually compared with a case where, the selection area 3A is not selected. In the image 503L, the image of the selection area 3A belonging to the ring shape selection area group 3Q includes the background image 3G in the selection area 3A and the overlapping image 3F in the selection area 3A. The background image 3G is displayed as the background of the selection area 3A. The overlapping image 3F is displayed and overlapped over the background image 3G. The overlapping image 3F is the input image 3C. In the image 503L in FIG. 9, the overlapping image 3F is displayed and emphasized as the input image 3C. Here, the overlapping image 3F is a string of letters for representing the control to be executed when the selection area 3A is selected, determined and input. When the overlapping image 3F is selected, the overlapping image 3F together with the background image 3G is emphasized, compared with a case where the overlapping image 3F is not selected. When the selection area 3A is selected, the overlapping image 3F is enlarged, and each letter of the overlapping image 3F is brightly displayed, compared with a case where the selection area 3A is not selected. The background image 3G is an ornamental image for decorating the background and around the letter string image 3F. The background image 3G is changeable in accordance with the display position of the selection area 3A. When the selection area 3A corresponding to the background image 3G is selected, the background image 3G is enlarged and emphasized.

The ring shape selection area group 3Q includes four selection areas 3A, which are arranged in a cross shape manner around the predetermined reference point O on the display screen 30. Specifically, four selection areas 3A are arranged on the up side, the down side, the right side and the left side of the reference point O. One of the selection areas 3A disposed on the left side of the point O is selected as the input image 3C, so that the image of the one of the selection areas 3A is enlarged and displayed. Thus, the point O of the images of the selection areas 3A shifts to the right side with respect to the center of the screen. Thus, the control unit 10 controls the display device 3 to display and enlarge the selected selection area 3A as the input image 3C in the ring shape selection area group 3Q. Further, the control unit 10 controls the display device 3 to display and shift other selection areas 3A, which are not selected, to a predetermined position, which is spaced apart from the selected selection area 3A. Thus, the control unit 10 changes the display position of the other selection areas 3A.

In the selection screen image 503L in FIG. 9, the selection areas 3A in the ring shape selection area group 3Q are arranged in the cross shape manner such that each selection area 3A corresponds to a respective side of the selection screen image 500 as a screen edge of the screen. In this case, a correspondence between the selection area 3A and the nearest side of the selection screen image 500 is determined. When the user operates the knob 20 of the complex operation unit 2 to displace the knob 20 to the side corresponding to the selected selection area 3A, i.e., when the user displace the knob 20 to the left side, (or when the user moves the cursor 3P to the outside of the screen), the operation for retuning to the upper level is partially or completely executed. Here, the control unit 10 newly sets the level return operation direction display region 3R in the image periphery region 511 on the nearest screen edge side of the selected selection area 3A, which is disposed on the left side of the screen. Further, the control unit 10 controls the display device 3 to display the return image 3E, which provides the input image 3C.

Figure 12:
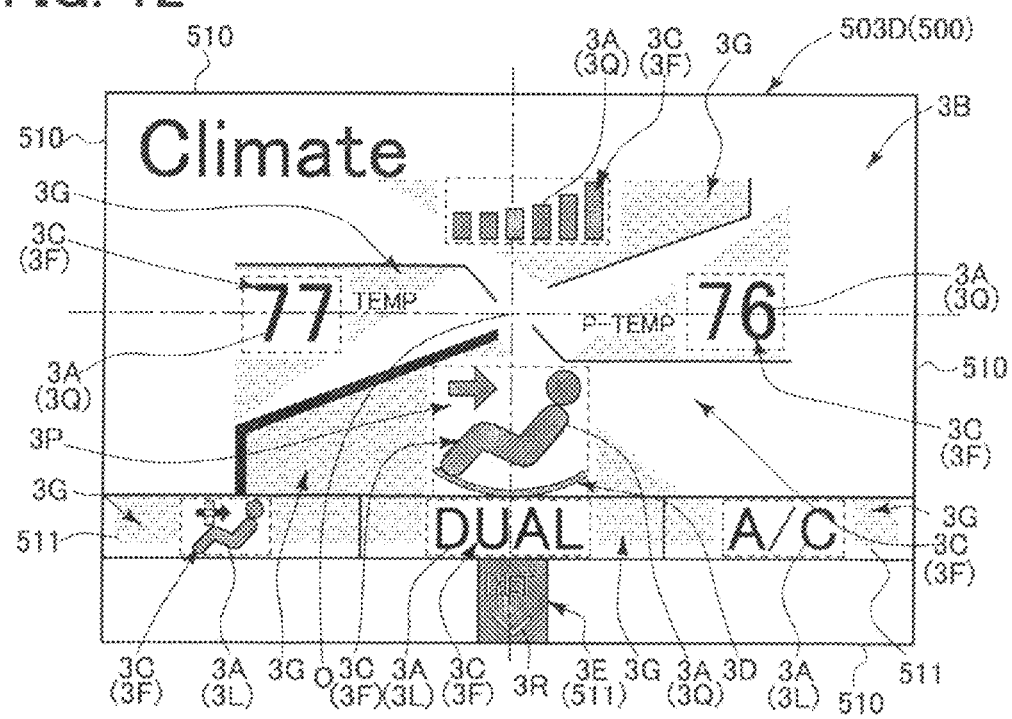
FIG. 12 is a diagram showing a selection screen image of the lower hierarchy of the screen image in FIG. 8 after the one selection region in the screen image in FIG. 8 is selected, and a selection region in FIG. 12 is different from the selection regions in FIGS. 9 to 11.

When the display device 3 displays the image 503L in FIG. 9, and the user wants to select another selection area 3A, the user performs the operation for switching from the currently selected selection area 3A to a newly selected selection area 3A such that the displacing operation method is executed. Thus, the operation for selecting the new selection area is defined as the displacing operation method. When the user wants to change a control condition such as a control parameter corresponding to the selected selection area 3A, the user performs the rotation operation method. Thus, the operation for changing the control condition is defined as the rotation operation method. More specifically, when the user executes the rotation operation of the complex operation unit 2, the control parameter corresponding to the selected selection area 3A is changed according to a rotation operation amount. When the user moves the complex operation unit 2 to one of four directions of the cross shape, the cursor 3P is moved to the selection area 3A corresponding to the one of four directions, which is the operation direction of the displacing operation method, so that the selection area 3A is newly selected. Here, the auxiliary image 3D representing the operation motion line of the complex operation unit 2 in the rotation operation method is displayed and overlapped over the background image 3B on a whole of the screen image. When the image 503L in FIG. 9 is displayed, and the complex operation unit 2 is displaced to the right direction, the image 503R in FIG. 10 is displayed. When the image 503L in FIG. 9 is displayed, and the complex operation unit 2 is displaced to the up direction, the image 503U in FIG. 11 is displayed. When the image 503L in FIG. 9 is displayed, and the complex operation unit 2 is displaced to the down direction, the image 503D in FIG. 12 is displayed.

In FIG. 8, the selected selection area 3A is disposed on the left side of the screen. However, in the image 503R in FIG. 10, the selected selection area 3A in the ring shaped selection area group 3Q is disposed on the right side of the screen. In the image 503U in FIG. 11, the selected selection area 3A in the ring shaped selection area group 3Q is disposed on the up side of the screen.

In the images 503R, 503U in FIGS. 10 and 11, similar to the image 503L in FIG. 9, the selected selection area 3A, which is in the cursor selected state, provides the input image 3C, which is emphasized and displayed, compared with a case where the input image 3C is not selected. Further, the reference point O shifts to a side apart from the selected selection area 3A. The other selection areas 3A as the input images 3C in the ring shaped selection area group 3Q are displayed around the reference point O as the center of the images 3C. The auxiliary image 3D and the like are also displayed. Further, the operation method is the same as the image 503L. Specifically, when the user rotates the complex operation unit 2, the control parameter corresponding to the selected selection area 3A is changed in accordance with the rotation amount. Further, when the user moves the complex operation unit 2 to one of the four directions in the cross shape manner, the cursor 3P is moved to one of the selection areas 3A corresponding to the displacing operation so that the one of the selection areas 3A is newly selected. Further, the level return operation direction display region 3R is displayed in the image periphery region 511 on the nearest screen edge side of the selected selection area 3A. Similar to FIG. 9, the return image 3E is emphasized and displayed in the level return operation direction display region 3R.

Thus, the operation direction of the complex operation unit 2 for returning to the up level and the level return operation direction display region 3R are determined according to the display position of the selected selection area 3A in the selection screen image 500. When the currently selected selection area 3A is switched to a new selection area 3A, the operation direction of the operation in the complex operation unit 2 for returning to the up level is changed. Further, the level return operation direction display region 3R is disappeared from the display position of the currently selection area 3A. Then, the level return operation direction display region 3R is newly appeared at a new position. The return image 3E corresponding to the new selection area 3A is displayed at the new position.

The level return operation direction display region 3R according to the present embodiment is basically set in the image periphery region 511, which is the nearest from the selected selection area 3A, as shown in FIGS. 9 to 11. However, when another selection area 3A is already disposed in the image periphery region 511 corresponding to the selected selection area 3A, the level return operation direction display region 3R can not be set in the image periphery region 511. For example, when the selection area 3A in the ring shaped selection area group 3Q disposed on the down side of the screen is selected, the control unit 10 moves another selection area 3A to a position in the screen image 500, which is different from the image periphery region 511, and then the control unit 10 sets the level return operation direction display region 3R in the image periphery region 511, as shown in FIG. 12.

In FIG. 12, the selected selection area 3A in the ring shaped selection area group 3Q is disposed on the down side of the screen. Originally, one of the selection areas 3A in the linear shape selection area group 3L exists on the down side of the screen. Thus, the control unit 10 moves the one of the selection areas 3A in the linear shape selection area group 3L to be apart from the image periphery region 511, which is the nearest of the selected selection area 3A. Then, the control unit 10 sets the level return operation direction display region 3R in the image periphery region 511 since the one of the selection areas 3A in the linear shape selection area group 3L is moved from the image periphery region 511. Further, the control unit 10 controls the display device 3 to display the return image 3E in the level return operation direction display region 3R. The display mode of the one of the selection areas 3A in the linear shape selection area group 3L, which is moved, is the same as the one of the selection areas 3A before moving. Thus, the display mode of the one of the selection areas 3A is not changed. In the present embodiment, the one of the selection areas 3A in the linear shape selection area group 3L together with other selection areas 3A in the linear shape selection area group 3L is moved as a whole. The one of the selection areas 3A and the other selection areas 3A belong to the same linear shape selection area group 3L. Thus, a whole of the linear shape selection area group 3L is moved. Accordingly, the display mode of all of the selection areas 3A in the same linear shape selection area group 3L is not changed.

In FIG. 12, the cursor 3P cannot be directly displaced to the level return operation direction display region 3R from the selected selection area 3A, and selects the return image 3E in the level return operation direction display region 3R. Since the selection areas 3A in the linear shape selection area group 3L are arranged just under the selected selection area 3A, and the return image 3E in the level return operation direction display region 3R is disposed under the linear shape selection area group 3L, it is necessary to select one of the selection areas 3A in the linear shape selection area group 3L once. Specifically, after the one of the selection areas 3A in the linear shape selection area group 3L is selected, the return image 3E in the level return operation direction display region 3R can be selected. When the one of the selection areas 3A in the linear shape selection area group 3L is selected, the screen image is switched to the image in FIG. 15.

The images 503X, 503Y, 503Z in FIGS. 13 to 15 are similar to the images in FIGS. 9 to 12. However, the selected selection area 3A, which is selected by the cursor 3P, in FIGS. 13 to 15 is different from in FIGS. 9 to 12. The images 503X, 503Y, 503Z is displayed when one of the selection areas 3A in the linear shape selection area group 3L is selected. However, the selection areas 3A in the linear shape selection area group 3L is arranged in a linear shape manner along with one of the screen edges 510, which is the nearest edge of the linear shape selection area group 3L. Thus, each of the selection area 3A is disposed in the image periphery region 511. Accordingly, when one of the selection areas 3A in the linear shape selection area group 3L is selected, the selected selection area 3A is separated from the screen edge 510 of the selection screen image 500, which is the nearest edge of the selected selection area 3A. Further, the control unit 10 sets the level return operation direction display region 3R corresponding to the selected selection area 3A in the image periphery region 511, which is disposed between the screen edge 510 and the selected selection area 3A separated from the original position of the selection area 3A. Then, the control unit 10 controls the display device 3 to display the selected selection area 3A at a position separated from the original position and the return image 3E corresponding to the selected selection area 3A in the image periphery region 511.

Each of the selection areas 3A in the linear shape selection area group 3L, which provides to display the image 503X, 503Y, 503Z in FIGS. 13 to 15, and is selected by the complex operation unit 2, includes an overlapping image 3F in a selection area and a background image 3G in the selection area. The background image 3G is displayed as the background of the selection area 3A. The overlapping image 3F is displayed and overlapped over the background image 3G. When the selection areas 3A are not selected, the background image 3G in each selection area showing the linear shape selection area group 3L has a bar shape such that all background images 3G in the linear shape selection area group 3L are coupled with each other in a linear shape manner. Thus, the linear shape selection area group 3L provides the linear shape continuously. On the other hand, the overlapping image 3F in each selection area in the linear shape selection area group 3L is the input image 3C, which is selectable by the complex operation unit 2 when the selection areas 3A are not selected. Further, the overlapping image 3F is the letter string image showing the control executed at a time when the corresponding selection area 3A is selected, determined and input.

When one of the selection areas 3A (i.e., overlapping images 3F in the selection areas 3A) in the linear shape selection area group 3L is selected by the complex operation unit 2 in order to display a corresponding image 503X, 503Y, 503Z shown in FIGS. 13 to 15, a determining and inputting image 3I is newly set and displayed at a center of the screen image. The selection area 3A, which is selected just before the corresponding image 503X, 503Y, 503Z is displayed, is moved to the determining and inputting image 3I from the image periphery region 511. Accordingly, the cursor 3P just after the determining and inputting image 3I is displayed is disposed on the determining and inputting image 3I so that the determining and inputting image 3I is selected. When the user determines and input with using the complex operation unit 2, the control corresponding to the determining and inputting image 3I is executed. Here, the selection area 3A, selected just before the corresponding image 503X, 503Y, 503Z is displayed, may be continuously displayed without setting and displaying the determining and inputting image 3I, and the selection area 3A may be determined and input so that the control corresponding to the selection area 3A is executed.

On the other hand, when the user selects with using the complex operation unit 2 in order to display one of the images 503X, 503Y, 503Z in FIGS. 13 to 15, and the selection area 3A is moved to the determining and inputting image 3I, the overlapping image 3F in the selection area 3A as the letter string image in the image periphery region 511, which provides the selection area 3A, shifts to a position different from the image periphery region 511. Then, the level return operation direction display region 3R corresponding to the selected selection area 3A is set to be a new selection area 3A in the image periphery region 511 after the image periphery region 511 shifts. Further, the corresponding return image 3E is displayed.

Here, the overlapping image 3F in the selection area 3A, which shifts to the position different from an initial position, is disposed at a position, which is spaced apart from the screen edge 510 as the nearest edge of the selection area 3A toward the inside of the screen image. The overlapping image 3F is emphasized and displayed compared with a case where the overlapping image 3F is not selected. Thus, the control content to be executed is emphasized and displayed when the newly displayed determining and inputting image 3I is determined and input with using the complex operation unit 2. Here, the overlapping image 3F in the selection area 3A is emphasized and displayed with enlarging the image 3F compared with a case where the overlapping image 3F in the selection area 3A is not selected. Specifically, the overlapping image 3F corresponding to the selected selection area 3A stands out from the background image 3G, and shifts to a different position. Further, the overlapping image 3F is enlarged compared with a case where the overlapping image 3F is not selected. Furthermore, the level return operation direction display region 3R is displayed adjacent to the overlapping image 3F. On the other hand, the background image 3G is an ornamental image for decorating the background and around the overlapping image 3F. Even when the overlapping image 3F shifts to the different position, the background image 3G does not shift. At least one of the level return operation direction display regions 3R is set to be in the background image 3G. The return image 3E is overlapped and displayed over the background image 3G.

In the present embodiment, when the image 503X, 503Y, 503Z in FIGS. 13 to 15 is displayed, the control unit 10 controls the display device 3 to display other images with reducing the emphasis level. The newly displayed determining and inputting image 3I, the return image 3E, the overlapping image 3F corresponding to the selected selection area 3A for displaying the image are not the other images. Further, the control unit 10 sets the newly displayed determining and inputting image 3I and the return image 3E to be the selection area 3A. The control unit 10 sets such that the images other than the newly displayed determining and inputting image 3I and the return image 3E are not the selection area 3A so that the other images can not be selected by the cursor 3P.

In the image 503X, 503Y, 503Z in FIGS. 13 to 13, the control content to be executed by the control unit 10 when the determining and inputting image 3I is determined and input is to switch between the on state and the off state of the control on a certain device. The overlapping image 3F representing a case where the control content is to turn on the certain device is more emphasized than a case where the control content is to turn off the device. Here, the letters showing the control content representing a case where the control content is to turn on the certain device are more brightly displayed than a case where the control content is to turn off the device without depending on a fact whether the cursor 3P selects or not.

The images 503X, 503Z in FIGS. 13 and 14 are images when the selection area 3A disposed in the screen image corner region 512 as the image periphery region 511 are selected among the selection areas 3A in the linear shape selection area group 3L. The screen image corner region 512 includes multiple nearest sides 510 (i.e., screen edge) of the selection screen image 500. When the selection area 3A disposed at the screen image corner region 512 is selected by the complex operation unit 2, the level return operation direction display region 3R may be set and displayed on at least one of the nearest sides 510. Alternatively, the level return operation direction display region 3R may be set and displayed on all of the multiple nearest sides 510. In FIGS. 13 and 14, the level return operation direction display regions 3R are set and displayed in the image periphery regions 511 on two nearest sides 510 of the selection screen image 500, respectively with respect to the screen image corner region 512, in which the selection area 3A is displayed initially. Here, the two nearest sides 510 provide a corner of the screen image 500 therebetween. Each of the level return operation direction display regions 3R are set to be the selection area 3A, and further, the return image 3E is displayed in each of the level return operation direction display regions 3R. Here, each of the level return operation direction display regions 3R shown in FIGS. 13 and 14 is displayed adjacent to the shifted overlapping image 3F between the shifted overlapping image 3F and the nearest side 510 adjacent to the shifted overlapping image 3F when the level return operation direction display region 3R is selected by the complex operation unit 2 in order to display the image 503X, 503Z.

In the image 503X, 503Z in FIGS. 13 and 14, the auxiliary image 3D includes the first auxiliary image 3D and the second auxiliary image 3D. The first auxiliary image 3D is disposed on the upper side of the selected selection area 3A for displaying the image 503X, 503Z, and shows the displacing operation direction to the selection area 3A in the ring shaped selection area group 3Q disposed on the lower side of the screen image 500. The second auxiliary image 3D shows the displacing operation direction to the selection area 3A in the linear shape selection area group 3L adjacent to the selected selection area 3A. Here, each of three auxiliary images 3D is displayed on a side corresponding to the displacing operation direction adjacent to the shifted overlapping image 3F, which is selected for displaying the image 503X, 503Z in FIGS. 13 and 14 so that the overlapping image 3F shifts to the display position from the initial display position.

The image 503Y in FIG. 15 is an image when the selection area 3A in the image periphery region 511 disposed at a middle portion of the linear shape selection area group 3L other than the screen image corner region 512 is selected. The image periphery region 511 includes only one nearest side 510 of the screen image 500 adjacent to the image periphery region 511. When the selection area 3A in the image periphery region 511 is selected by the complex operation unit 2, the level return operation direction display region 3R is set on the only one nearest side 510 with respect to the selection area 3A. Similarly, the return image 3E is displayed in the level return operation direction display region 3R. The level return operation direction display region 3R in FIG. 15 is displayed adjacent to the overlapping image 3F between the only one nearest side 510 adjacent to the overlapping image 3F and the shifted overlapping image 3F, which shifts when the overlapping image 3F is selected by the complex operation unit 2 for displaying the image 503Y.

In the image 503Y in FIG. 15, the auxiliary image 3D includes the first auxiliary image 3D and the second auxiliary image 3D. The first auxiliary image 3D is disposed on the upper side of the selected selection area 3A for displaying the image 503Y, and shows the displacing operation direction to the selection area 3A in the ring shaped selection area group 3Q disposed on the lower side of the screen image 500. The second auxiliary image 3D shows the displacing operation direction to the selection area 3A in the linear shape selection area group 3L adjacent to the selected selection area 3A. Here, each of two auxiliary images 3D is displayed on a side corresponding to the displacing operation direction adjacent to the shifted overlapping image 3F, which is selected for displaying the image 503Y in FIG. 15 so that the overlapping image 3F shifts to the display position from the initial display position.

In the selection screen image 500 according to the present embodiment, the background images 3G are overlapped and displayed over the background image 3B. The background images 3G have the same design on the same rotation direction side around the reference point O as the center so that the background images 3G provide a wind mill shape, which associates with rotation.

The complex operation unit 2 according to the present embodiment is arranged as an auxiliary operation unit at a position near a seat of the compartment of the vehicle so that the operation load of the user is smaller than the main operation unit such as a mechanical switch arranged near the display screen 30 and a touch panel switch on the display screen 30. Here, as shown in FIG. 2, the complex operation unit 2 is arranged at a position so that both of a driver sitting on the driver seat and a passenger sitting on a passenger seat can operate the complex operation unit 2 under a condition that each user of the driver and the passenger sits down on the seat and rests their back on the back of the seat. Specifically, the complex operation unit 2 is disposed at a region C (a center console), which is sandwiched between the driver seat and the passenger seat. On the other hand, the display device 3 is arranged on the front side of the compartment so that the display device 3 is disposed on the front side from the complex operation unit 2 so that both of the driver and the passenger on the seat can see the display device 3.

Figure 18:
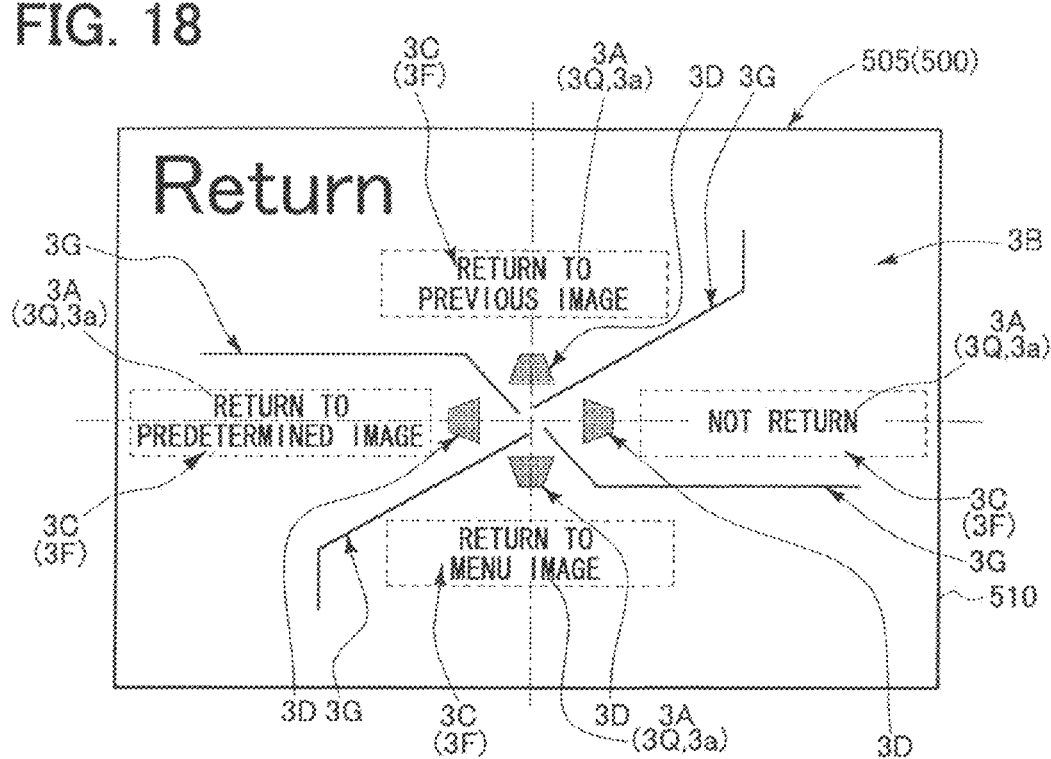
FIG. 18 is a diagram showing a screen image for selecting a return destination of the hierarchy.
Figure 19:
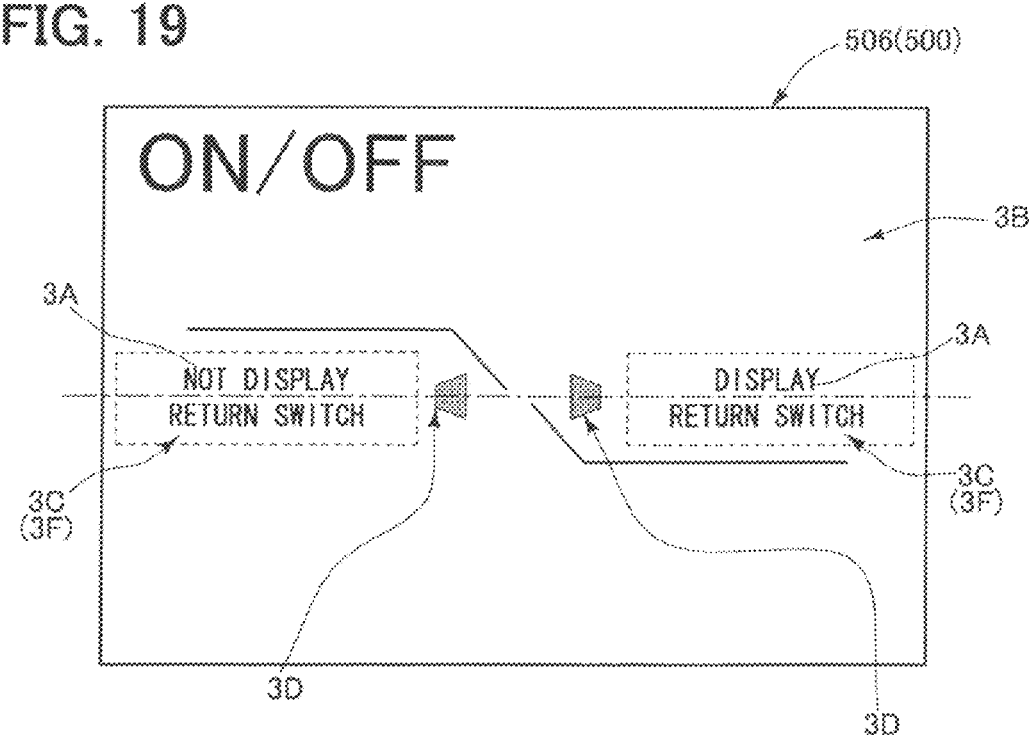
FIG. 19 is a diagram showing a screen image providing prohibition of displaying a return operation direction of the hierarchy.

In the above embodiment, the control unit 10 controls the display device 3 to switch the current display image to a predetermined upper level image when the return image 3E in the level return operation direction display region 3R is selected, determined and input by the complex operation unit 2. Alternatively, the control unit 10 may control the display device 3 to switch the current display image to a level return object selection screen image 505 (e.g., in FIG. 18) when the return image 3E in the level return operation direction display region 3R is selected, determined and input by the complex operation unit 2. The level return object selection screen image 505 includes multiple selection areas 3A for switching from the current display image to different upper level selection screen images 500. In this case, on the level return object selection screen image 505, which is switched from the current display image, one of the selection areas 3A is selected, determined and input by the complex operation unit 2 so that the control unit 10 controls the display device 3 to switch from the level return object selection screen image 505 to, for example, further upper level selection screen image 500 corresponding to the input one of the selection areas 3A. Thus, various level return operations can be available. The level return object selection screen image 505 in FIG. 18 may include the selection area 3A for returning to the top level image, the selection area 3A for returning to the upper level image, the selection area 3A for returning to a predetermined upper level image, and the selection area 3A for not returning to another level image but returning to the selection screen image 500, which is displayed previously before the selection screen image 500 is switched to the level return object selection screen image 505.

In the above embodiment, the operation directing to the outside of the screen from the selected selection area 3A provides the operation for returning to the upper level. In a case where the user recognizes that the operation directing to the outside of the screen from the selected selection area 3A provides the operation for returning to the upper level, it is no necessary to display the level return operation direction display region 3R every time. Accordingly, a display prohibition operation for prohibiting from displaying the level return operation direction display region 3R in the selection screen image 500 may be performed, and the control unit 10 may accept the display prohibition operation and execute the display prohibition operation. In this case, the control unit 10 functions as a display prohibition operation means. For example, one of the selection areas 3A on the top menu image 502 in FIG. 8 is selected, and then, the user operates various selections so that the selection screen image 506 for setting display prohibition is displayed. The selection screen image 506 includes an operation directing to the level return operation direction. When the user sets the selection area 3A corresponding to the display prohibition of the operation directing to the level return operation direction with using the complex operation unit 2, the control unit 10 sets a display prohibition mode for prohibiting the setting of the level return operation direction display region 3R and the displaying of the return image 3E. When the user sets the selection area 3A corresponding to the display allowance of the operation directing to the level return operation direction with using the complex operation unit 2, the control unit 10 sets a display allowance mode for allowing the setting of the level return operation direction display region 3R and the displaying of the return image 3E. In this case, the control unit 10 functions as a display allowance operation means. The control unit 10 executes the setting of the level return operation direction display region 3R and the displaying of the return image 3E according to the display mode. Specifically, step S13 in FIG. 6 is executed.

In the above embodiment, the control unit 10 sets the level return operation direction display region 3R, and controls the display device 3 to display the return image 3E just after the cursor 3P moves to a new selection area 3A when the lower level selection screen image 500 is displayed. Alternatively, the level return operation direction display region 3R may be set and the return image 3E may be displayed after a predetermined time such as one second has elapsed since the selected selection area 3A is switched.

Figure 16:
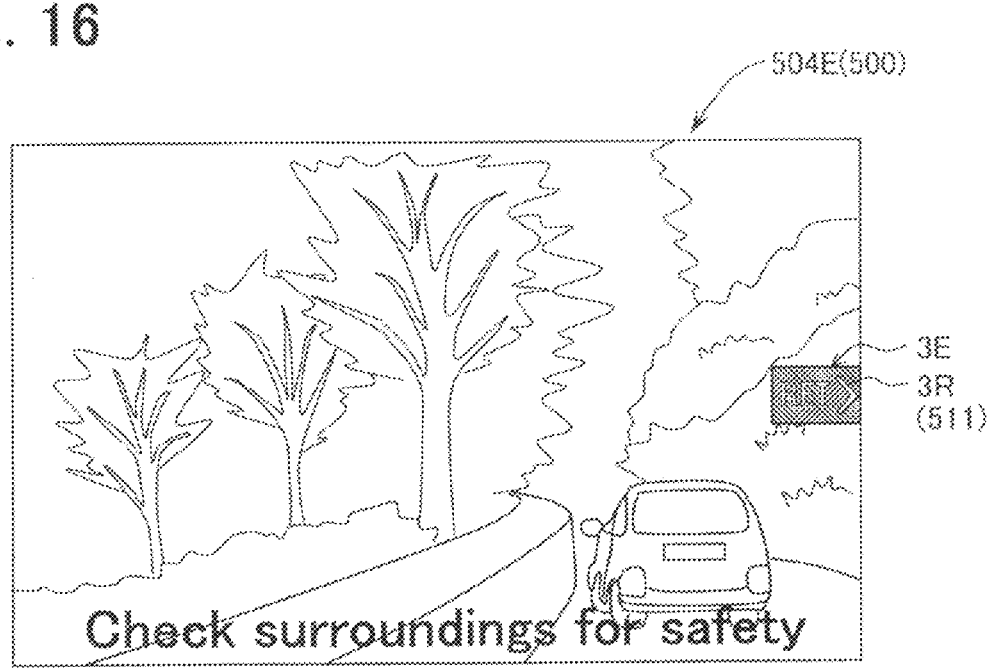
FIG. 16 is a diagram showing a screen image of the lower hierarchy of the screen image in FIG. 8 after the one selection region in the screen image in FIG. 8 is selected, and the screen image does not include a selection region.

In the above embodiment, when the selection area 3A of the upper level selection screen image 500 is selected, determined and input by the complex operation unit 2, the upper level selection screen image 500 may be moved to the lower level selection screen image 500 having no selection area 3A. In the image 504E in FIG. 16 is different from the images in FIGS. 9 to 15. When the selection area 3A in the ring shape selection area group 3Q as the image switching area 3a on the right side of the image is selected, determined and input, the control unit 10 controls the display device 3 to display the image 504E. In this case, the control unit 10 functions as a third image switching means.

The image 504E in FIG. 16 does not include the selection area 3A. In the present embodiment, the image 504E shows an image 3E for supporting the driver to drive the vehicle.

The image 3E is shot by a camera (not shown). The image 3E may be a stationary picture or a motion picture. In FIG. 16, the image 3E shows a rear view shooting image of the vehicle, and the camera shoots the rear view of the vehicle. There is no lower level image of the image 504E. However, even when the selection screen image 500 is switched to the image 3E having no selection area 3A, it is necessary to return to the upper level image. Accordingly, in the present embodiment, on the image 504E in FIG. 16 after the selection screen image 500 is switched, the level return operation direction display region 3R for switching from the currently displayed image 504E to the upper level selection screen image 500 is displayed at a position corresponding to the arrangement position of the selection area 3A, which is previously displayed, selected and input in the image 502 in FIG. 8 before the selection screen image 500 is switched. The level return operation direction display region 3R is visually identified in the currently displayed image 504E. In this case, the control unit 2 functions as a second level return operation direction display means. In case of the image 504E in FIG. 16, the level return operation direction display region 3R is set at the same position in the image 504E as the previously presented level return operation direction display region 3R in the previous upper level image 502. Further, the return image 3E is displayed at the level return operation direction display region 3R.

Figure 17:
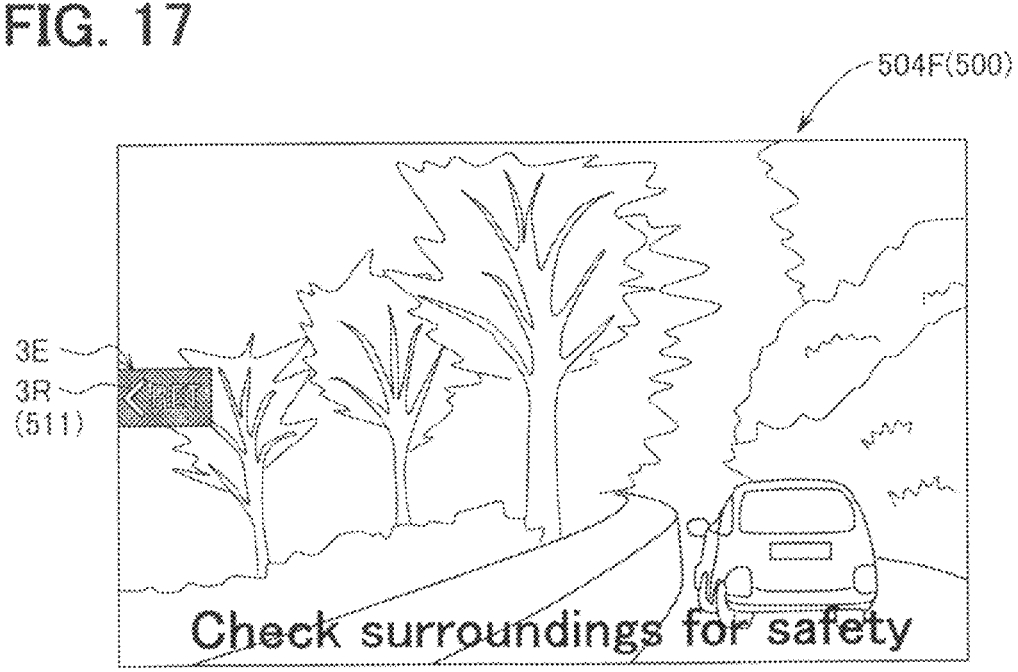
FIG. 17 is a diagram showing another screen image of the lower hierarchy of the screen image in FIG. 8 after the one selection region in the screen image in FIG. 8 is selected, and the screen image does not include a selection region.

Alternatively, the image 504F in FIG. 17 instead of the image 504E in FIG. 16. In case of FIG. 17, the level return operation direction display region 3R is set in the image 504F at a position corresponding to the previously presented level return operation direction display region 3R in the previous upper level image 502, i.e., the level return operation direction display region 3R is set in the image 504F at the position opposite to the previously presented level return operation direction display region 3R. Further, the return image 3E is displayed at the level return operation direction display region 3R.

In the complex operation unit 2 according to the above embodiment, the operation direction of the displacing operation includes four directions in the cross shape manner. Alternatively, the operation direction of the displacing operation may include two directions or three directions, which are less than four directions. Alternatively, the operation direction of the displacing operation may include eight directions, six directions or the like, which are more than four directions. Further, the operation direction may be formed to extend in a radial manner at predetermined intervals from a standard position. In these cases, it is necessary to arrange the selection areas 3A in the selection screen image 500 according to the operation direction of the complex operation unit 2 and the number of operation directions.

The above disclosure has the following aspects.

According to a first aspect of the present disclosure, an in-vehicle input system includes: a display device for displaying a plurality of selection screen images, which are switchable to each other, wherein each selection screen image includes a plurality of selection areas; a selection operation device for moving a cursor from one selection area to another adjacent selection area on one of the selection screen images along with an operation direction so that the another adjacent selection area is selected alternatively, and for inputting the selected another adjacent selection area; a first image switching device for switching from the one of the selection screen images to another one of the selection screen images when the another adjacent selection area on the one of the selection screen images is input by the selection operation device, wherein the another one of the selection screen images is a lower level selection screen image of the one of the selection screen images, and corresponds to the input another adjacent selection area; a second image switching device for switching from the one of the selection screen images to further another one of the selection screen images when the selection operation device selects and inputs a side area of the another adjacent selection area under a condition that the another adjacent selection area is selected, wherein the side area is disposed on a nearest screen edge side of the selected another adjacent selection area, and the further another one of the selection screen images is a upper level of the one of the selection screen images, and corresponds to the input side area; and a level return operation direction display device for emphasizing visually and displaying the side area as a level return operation direction display area under the condition that the another adjacent selection area is selected by the selection operation device, wherein the side area is emphasized compared with a case where the another adjacent selection area is not selected.

In the above case, the operation of selecting the side area of the another adjacent selection area disposed on the nearest screen edge side of the selected another adjacent selection area provides to return to the upper level of the one of the selection screen images. Specifically, the operation for moving from the current level to the lower level is defined as the operation such that the selection area disposed on the current level screen image is selected and determined. The operation for moving from the current level to the upper level is defined as the operation such that the cursor is moved toward the outside of the screen image, which is different from the operation to select the selection area. In this case, the cursor is moved from the inside of the image to the outside of the image, i.e., moved a part from the image. Accordingly, the operation for returning to the upper level screen image gives an impression for the user to move a part from the current screen image. Specifically, the operation for switching from the current level screen image to the upper level screen image is easily and intuitively connected to the impression such that the current screen image is removed, and returned to the upper level screen image as a return image. Accordingly, the operation for returning to the upper level screen image is intuitively connected to the recognition of returning operation from the current level screen image to the upper level screen image, according to the operation direction. Further, since the level return operation direction display area is emphasized so that the operation direction to return to the upper level screen image is also emphasized, and therefore, the user does not fails to operate. Thus, the operation direction of the level return operation direction display area directs to the outside of the screen image. Thus, the user can intuitively understands the operation to return the hierarchy, and easily executes the operation to return the hierarchy.

According to a second aspect of the present disclosure, an in-vehicle input system includes: a display device for displaying a plurality of screen images, which are switchable to each other, wherein each screen image includes a plurality of selection items, the screen images provides a hierarchical structure having an upper level screen image, a current level screen image and a lower level screen image; and the selection items includes a first selection item and a second selection item; a selection operation device for moving a cursor from the first selection item to the second selection item on the current level screen image along with an operation direction so that the second selection item is selected alternatively, and for inputting the selected second selection item; a first image switching device for switching from the current level screen image to the lower level screen image when the selected second selection item on the current level screen image is input, wherein the lower level screen image corresponds to the input second selection item; a second image switching device for switching from the current level screen image to the upper level screen image when the selection operation device selects and inputs a level return item of the selected second selection item under a condition that the second selection item is selected, wherein the level return item is disposed on a nearest screen edge side of the selected second selection item, and the upper level screen image corresponds to the level return item; and a level return item display device for emphasizing a display of the level return item when the second selection item is selected by the selection operation device, wherein the display of the level return item is emphasized compared with a case where the second selection item is not selected.

In the above system, the operation direction of the level return item directs to the outside of the screen image. Thus, the user can intuitively understands the operation to return the hierarchy, and easily executes the operation to return the hierarchy.

Alternatively, the display device may display the screen image on a whole of the display screen. Alternatively, the display device may display the screen image on a part of the display screen.

Alternatively, the level return item display device may emphasize the display of the level return item in a screen image edge region on the current screen image, and the screen image edge region is disposed on the nearest screen edge side of the selected second selection item. In this case, since the screen image edge region is also emphasized, the user can easily recognize the operation direction of the level return item.

Alternatively, the in-vehicle input system may further include: a level return item setting device for displaying the level return item of the selected second selection item on the current screen image to be one of the selection items for returning to the upper level screen image. The level return item display device emphasizes the display of the level return item on the current screen image. In this case, the level return item provides a new selection item. When the level return item as the selection item is selected and input, the current level screen image is returned to the upper level screen image. Specifically, since the new selection item shows the operation direction for returning to the upper level screen image, the user can intuitively understand the operation to return the hierarchy.

Alternatively, the level return item display device may emphasize the display of the level return item in a screen image edge region on the current screen image. The screen image edge region is disposed on the nearest screen edge side of the selected second selection item. The level return item setting device shifts another one of the selection items from the screen image edge region to another position of the current screen image when the another one of the selection items is arranged in the screen image edge region of the current screen image, and displays the level return item of the selected second selection item in the screen image edge region on the current screen image. In this case, the level return item is emphasized in the screen image edge region, which is the nearest screen edge side of the selected second selection item. Thus, the user has an impression of the operation to be spaced apart from the screen image. Thus, the impression provides an effect that the user intuitively recognizes the operation to return to the upper level. Even when the another one of the selection items is arranged in the screen image edge region, the another one of the selection items is moved to the another position. Thus, the level return item can be displayed at the screen image edge region.

Alternatively, the level return item display device may emphasize the display of the level return item in a screen image edge region on the current screen image. The screen image edge region is disposed on the nearest screen edge side of the selected second selection item. The level return item setting device shifts the selected second selection item from the screen image edge region to another position of the current screen image when the selected second selection item is arranged in the screen image edge region of the current screen image, and displays the level return item of the selected second selection item in the screen image edge region on the current screen image. In this case, even when the selected second selection item is arranged in the screen image edge region, the selected second selection item is moved to another position. Thus, the level return item can be displayed at the screen image edge region.

Alternatively, each of the selection items may be an overlapping image in a selection area, which is overlapped and displayed over a background image in the selection area The overlapping image of the second selection item is displayed and emphasized by the cursor when the cursor is disposed on the second selection item. The level return item setting device shifts the overlapping image of the second selection item from the screen image edge region to another position of the current screen image when the selected second selection item is arranged in the screen image edge region of the current screen image, displays the background image of the second selection item in the screen image edge region, and displays the level return item of the selected second selection item in the screen image edge region on the current screen image so that the level return item is overlapped over the background image. Here, the overlapping image is, for example, a control content display image for showing the control content to be executed when the selection item is input. Further, the overlapping image is emphasized by the cursor, so that the overlapping image seems to stand out from the background image, and to shift to a different position. Accordingly, this effect provides a new design. Furthermore, the level return item is displayed and emphasized near the screen edge.

Alternatively, the level return item setting device may display the level return item of the selected second selection item at all of a plurality of nearest screen edge sides of the selected second selection item when there are a plurality of nearest screen edges of the selected second selection item. In this case, since the operation to return to the upper level screen image is assigned to all of the nearest screen edge sides, the user can easily perform the operation to return to the upper level screen image.

Alternatively, the selection items of the current level screen image may include a ring shaped selection item group, in which the selection items are arranged in a ring shape.

Alternatively, the in-vehicle input system may further include: a level return item setting device for displaying the level return item of the selected second selection item on the current screen image to be one of the selection items for returning to the upper level screen image. The level return item display device emphasizes the display of the level return item on the current screen image. The current level screen image has a rectangular shape. Each selection item in the ring shaped selection item group is arranged to face a respective side of the rectangular shape so that the selection items of the ring shaped selection item group are arranged in a cross shape. The level return item setting device displays the level return item of the selected second selection item between the selected second selection item and a side of the rectangular shape of the current level screen image when the second selection item is selected, and the second selection item belongs to the ring shaped selection item group. The side of the rectangular shape of the current level screen image is the nearest screen edge of the selected second selection item. In this case, since the selection items are arranged in the ring shape, each selection item corresponds to a side of the rectangular shape. In view of the corresponding relationship between the selection items and the sides of the rectangular shape, the operation to return to the upper level screen image is shown.

Alternatively, the selection items of the current level screen image may include a linear shaped selection item group, in which the selection items are arranged in a linear shape.

Alternatively, the in-vehicle input system may further include: a level return item setting device for displaying the level return item of the selected second selection item on the current screen image to be one of the selection items for returning to the upper level screen image. The level return item display device emphasizes the display of the level return item on the current screen image. The current level screen image has a rectangular shape. The selection items in the linear shaped selection item group are arranged along with a side of the rectangular shape, which is a nearest edge of the linear shaped selection item group. The level return item setting device moves the selected second selection item from the side of the rectangular shape to be spaced apart from the side of the rectangular shape when the second selection item is selected, and the second selection item belongs to the linear shaped selection item group, and displays the level return item of the selected second selection item between the moved second selection item and the side of the rectangular shape of the current level screen image. Here, the ring shaped selection item group and the linear shaped selection item group may be displayed at the same time.

Alternatively, the selection items of the current level screen image may include a linear shaped selection item group, in which the selection items are arranged in a linear shape. The current level screen image has a rectangular shape. The selection items in the linear shaped selection item group are arranged along with a side of the rectangular shape, which is a nearest edge of the linear shaped selection item group. The level return item setting device shifts a whole of the linear shaped selection item group to be spaced apart from the side of the rectangular shape in order to move the selected second selection item from the side of the rectangular shape to be spaced apart from the side of the rectangular shape when another one of the selection items is arranged in the screen image edge region of the current screen image, and the another one of the selection items belongs to the linear shaped selection item group.

Alternatively, the second image switching device may switch from the current level screen image to a level return object selection screen image when the selection operation device selects and inputs the level return item of the selected second selection item. The level return object selection screen image includes a plurality of selection items for switching from the level return object selection screen image to upper level screen images, which are different from each other, respectively. The second image switching device switches from the level return object selection screen image to a corresponding upper level screen image of one of the selection items in the level return object selection screen image when the selection operation device selects and inputs the one of the selection items in the level return object selection screen image.

Alternatively, the in-vehicle input system may further include: a display prohibition operation device for receiving a display prohibition operation, which prohibits to display the level return item of the selected second selection item; and a display prohibition device for prohibiting the level return item display device from displaying the level return item when the display prohibition operation device receives the display prohibition operation.

Alternatively, the in-vehicle input system may further include: a third image switching device for switching from the current level screen image to another lower level screen image when the selection operation device selects and inputs a third selection item on the current level screen image, wherein the another lower level screen image corresponds to the input third selection item, and does not include any selection item; and a second level return item display device for displaying the level return item for returning from the another lower level screen image to the current level screen image visually identifiable at a position of the another lower level screen image. The position of the another lower level screen image corresponds to an arrangement position of the third selection item on the current level screen image.

Alternatively, the selection operation device may function as a cross direction operation unit. The cross direction operation unit is capable of moving an operation body of the selection operation device toward four directions of a cross shape, which corresponds to the cross shape of the selection items of the ring shaped selection item group.

Alternatively, the selection operation device may be a remote control device disposed in a compartment of a vehicle nearer a driver seat of the vehicle than the display device so that the selection operation device is operable for a driver of the vehicle under a condition that the driver sits down on the driver seat.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An in-vehicle input system comprising:
   a display device for displaying a plurality of screen images, which are switchable to each other, wherein each screen image includes a plurality of selection items, the screen images provides a hierarchical structure having an upper level screen image, a current level screen image and a lower level screen image, and the selection items includes a first selection item and a second selection item;
   a selection operation device for moving a cursor from the first selection item to the second selection item on the current level screen image along with an operation direction so that the second selection item is selected alternatively, and for inputting the selected second selection item;
   a first image switching device for switching from the current level screen image to the lower level screen image when the selected second selection item on the current level screen image is input, wherein the lower level screen image corresponds to the input second selection item;
   a second image switching device for switching from the current level screen image to the upper level screen image when the selection operation device selects and inputs a level return item of the selected second selection item under a condition that the second selection item is selected, wherein the level return item is disposed on a nearest screen edge side of the selected second selection item adjacent the selected second selection item, and the upper level screen image corresponds to the level return item; and
   a level return item display device for displaying and emphasizing a display of the level return item when the second selection item is selected by the selection operation device, wherein the display of the level return item is emphasized compared with a case where the second selection item is not selected so that the level return item is not displayed, wherein
   the level return item represents an operation for returning to the upper level screen image,
   when the second selection item is selected by the selection operation device, the level return item adjacent the second selection item and the second selection item are emphasized and displayed, as compared with not-selected selection items, and
   wherein the level return item of the selected second selection item is displayed only at a plurality of nearest screen edge sides of the selected second selection item when there are a plurality of nearest screen edges of the selected second selection item.

2. The in-vehicle input system according to claim 1, wherein the level return item display device emphasizes the display of the level return item in a screen image edge region on the current screen image, and
   wherein the screen image edge region is disposed on the nearest screen edge side of the selected second selection item.

3. The in-vehicle input system according to claim 1, further comprising:
   a microcomputer that executes a program stored in a memory device with instructions for displaying the level return item of the selected second selection item on the current screen image to be one of the selection items for returning to the upper level screen image, wherein the display of the level return item on the current screen image is emphasized.

4. The in-vehicle input system according to claim 3, wherein the level return item display device emphasizes the display of the level return item in a screen image edge region on the current screen image,
   wherein the screen image edge region is disposed on the nearest screen edge side of the selected second selection item, and
   wherein the program stored in the memory device and executed by the microcomputer includes instructions to shift another one of the selection items from the screen image edge region to another position of the current screen image when the another one of the selection items is arranged in the screen image edge region of the current screen image, and displays the level return item of the selected second selection item in the screen image edge region on the current screen image.

5. The in-vehicle input system according to claim 3,
wherein the level return item display device emphasizes the display of the level return item in a screen image edge region on the current screen image,
wherein the screen image edge region is disposed on the nearest screen edge side of the selected second selection item, and
wherein the program stored in the memory device and executed by the microcomputer includes instructions to shift the selected second selection item from the screen image edge region to another position of the current screen image when the selected second selection item is arranged in the screen image edge region of the current screen image, and displays the level return item of the selected second selection item in the screen image edge region on the current screen image.

6. The in-vehicle input system according to claim 5,
wherein each of the selection items is an overlapping image in a selection area, which is overlapped and displayed over a background image in the selection area,
wherein the overlapping image of the second selection item is displayed and emphasized by the cursor when the cursor is disposed on the second selection item, and
wherein the program stored in the memory device and executed by the microcomputer includes instructions to shift the overlapping image of the second selection item from the screen image edge region to another position of the current screen image when the selected second selection item is arranged in the screen image edge region of the current screen image, displays the background image of the second selection item in the screen image edge region, and displays the level return item of the selected second selection item in the screen image edge region on the current screen image so that the level return item is overlapped over the background image.

7. The in-vehicle input system according to claim 6,
wherein the selection items of the current level screen image include a linear shaped selection item group, in which the selection items are arranged in a linear shape,
wherein the current level screen image has a rectangular shape,
wherein the selection items in the linear shaped selection item group are arranged along with a side of the rectangular shape, which is a nearest edge of the linear shaped selection item group, and
wherein the program stored in the memory device and executed by the microcomputer includes instructions to shift a whole of the linear shaped selection item group to be spaced apart from the side of the rectangular shape in order to move the selected second selection item from the side of the rectangular shape to be spaced apart from the side of the rectangular shape when another one of the selection items is arranged in the screen image edge region of the current screen image, and the another one of the selection items belongs to the linear shaped selection item group.

8. The in-vehicle input system according to claim 1,
wherein the selection items of the current level screen image include a ring shaped selection item group, in which the selection items are arranged in a ring shape.

9. The in-vehicle input system according to claim 8,
further comprising:
a microcomputer that executes a program stored in a memory device with instructions for displaying the level return item of the selected second selection item on the current screen image to be one of the selection items for returning to the upper level screen image,
wherein the level return item display device emphasizes the display of the level return item on the current screen image,
wherein the current level screen image has a rectangular shape,
wherein each selection item in the ring shaped selection item group is arranged to face a respective side of the rectangular shape so that the selection items of the ring shaped selection item group are arranged in a cross shape,
wherein the program stored in the memory device and executed by the microcomputer includes instructions to display the level return item of the selected second selection item between the selected second selection item and a side of the rectangular shape of the current level screen image when the second selection item is selected, and the second selection item belongs to the ring shaped selection item group, and
wherein the side of the rectangular shape of the current level screen image is the nearest screen edge of the selected second selection item.

10. The in-vehicle input system according to claim 9,
wherein the selection operation device functions as a cross direction operation unit, and
wherein the cross direction operation unit is capable of moving an operation body of the selection operation device toward four directions of a cross shape, which corresponds to the cross shape of the selection items of the ring shaped selection item group.

11. The in-vehicle input system according to claim 1,
wherein the selection items of the current level screen image include a linear shaped selection item group, in which the selection items are arranged in a linear shape.

12. The in-vehicle input system according to claim 11,
further comprising:
a microcomputer that executes a program stored in a memory device with instructions for displaying the level return item of the selected second selection item on the current screen image to be one of the selection items for returning to the upper level screen image,
wherein the level return item display device emphasizes the display of the level return item on the current screen image,
wherein the current level screen image has a rectangular shape,
wherein the selection items in the linear shaped selection item group are arranged along with a side of the rectangular shape, which is a nearest edge of the linear shaped selection item group, and
wherein the program stored in the memory device and executed by the microcomputer includes instructions to move the selected second selection item from the side of the rectangular shape to be spaced apart from the side of the rectangular shape when the second selection item is selected, and the second selection item belongs to the linear shaped selection item group, and displays the level return item of the selected second selection item between the moved second selection item and the side of the rectangular shape of the current level screen image.

13. The in-vehicle input system according to claim 1,
wherein the second image switching device switches from the current level screen image to a level return object selection screen image when the selection operation device selects and inputs the level return item of the selected second selection item, wherein the level return object selection screen image includes a plurality of selection items for switching from the level return object selection screen image to upper level screen images, which are different from each other, respectively, and wherein the second image switching device switches from the level return object selection screen image to a corresponding upper level screen image of one of the selection items in the level return object selection screen image when the selection operation device selects and inputs the one of the selection items in the level return object selection screen image.

14. The in-vehicle input system according to claim 1, further comprising:
a microcomputer that executes a program stored in a memory device with instructions for receiving a display prohibition operation, which prohibits to display the level return item of the selected second selection item; and wherein the program stored in the memory device and executed by the microcomputer includes instructions for prohibiting the level return item display device from displaying the level return item when the display prohibition operation device receives the display prohibition operation.

15. The in-vehicle input system according to claim 1, further comprising:
a third image switching device for switching from the current level screen image to another lower level screen image when the selection operation device selects and inputs a third selection item on the current level screen image, wherein the another lower level screen image corresponds to the input third selection item; and a second level return item display device for displaying the level return item for returning from the another lower level screen image to the current level screen image visually identifiable at a position of the another lower level screen image, wherein the position of the another lower level screen image corresponds to an arrangement position of the third selection item on the current level screen image.

16. The in-vehicle input system according to claim 1, wherein the selection operation device is a remote control device disposed in a compartment of a vehicle nearer a driver seat of the vehicle than the display device so that the selection operation device is operable for a driver of the vehicle under a condition that the driver sits down on the driver seat.

17. The in-vehicle input system according to claim 1, wherein the level return item adjacent to the second selection item is emphasized and displayed even when the level return item is not selected.

18. The in-vehicle input system according to claim 17, wherein when the second selection item is selected by the selection operation device, the second selection item is emphasized and displayed so that a size of a selected second selection item is larger than a size of a not-selected second selection item.

19. The in-vehicle input system according to claim 1, wherein the plurality of selection areas on each screen image are automatically displayed on the display device without manual input to the display device by a user.

20. The in-vehicle input system according to claim 1, wherein when the second selection item is selected by the selection operation device, the second selection item is enlarged.

21. The in-vehicle input system according to claim 1, wherein when the second selection item is selected by the selection operation device, a size of the second selection item is larger than not-selected selection items.

22. The in-vehicle input system according to claim 21, wherein when the second selection item is selected by the selection operation device, the level return item adjacent the second selection item is displayed, and the level return item adjacent the not-selected selection items is not displayed.

* * * * *